US011461692B2

(12) United States Patent
Jeng et al.

(10) Patent No.: US 11,461,692 B2
(45) Date of Patent: Oct. 4, 2022

(54) SYSTEM AND METHOD FOR SINGLE-LOOP VEHICLE CLASSIFICATION USING INDUCTIVE LOOP VEHICLE SIGNATURES

(71) Applicant: CLR Analytics Inc., Irvine, CA (US)

(72) Inventors: Shin-Ting Jeng, Corona, CA (US); Qi Lin, Irvine, CA (US); Huabing Wang, Pittsburgh, PA (US); Lianyu Chu, Irvine, CA (US)

(73) Assignee: CLR Analytics Inc., Irvine, CA (US)

( * ) Notice: Subject to any disclaimer, the term of this patent is extended or adjusted under 35 U.S.C. 154(b) by 1072 days.

(21) Appl. No.: 15/955,647

(22) Filed: Apr. 17, 2018

(65) Prior Publication Data

US 2019/0318273 A1  Oct. 17, 2019

(51) Int. Cl.
*G06N 20/00* (2019.01)
*G06N 5/04* (2006.01)

(52) U.S. Cl.
CPC .............. *G06N 20/00* (2019.01); *G06N 5/047* (2013.01)

(58) Field of Classification Search
CPC ................................ G06N 20/00; G06N 5/047
See application file for complete search history.

(56) References Cited

PUBLICATIONS

Rene Sanchez, "Vehicle Re-Identification using Wireless Magnetic Sensors: Algorithm Revision, Modifications and Performance Analysis", IEEE, 2011 (Year: 2011).*
Shin_Ting, "Wavelet-k Nearest Neighbor Vehicle Classification Approach with Inductive Loop Signatures", 2013 (Year: 2013).*
Wenteng Ma, "A Wireless Accelerometer-Based Automatic Vehicle Classification Prototype System", IEEE, 2014 (Year: 2014).*
Senaras, "An Automated Building Extraction Model Using Fuzzy K-NN Classifier From Monocular Aerial Images", 2007 (Year: 2007).*
Mohan, "Wavelets on graphs with application to transportation networks", 2014 (Year: 2014).*
Zhang, "A Wavelet Based All-frequency Environment Lighting Rendering Method", 2015 (Year: 2015).*
FHWA, U.S. Department of Transportation (2016). Traffic Monitoring Guide.

(Continued)

*Primary Examiner* — Ann J Lo
*Assistant Examiner* — Van C Mang
(74) *Attorney, Agent, or Firm* — Hsuanyeh Law Group, PC

(57) ABSTRACT

Single loop inductive sensors are widely deployed in infrastructure for traffic data collection, however, these loops currently provide little more than vehicle detection. A system and method are provided that enable single loop inductive sensors to be used for vehicle classification (e.g., identification as motorcycle, passenger car, bus, etc.). Classification may be done using the Federal Highway Administration's 13 class system. Initially a signature library is built from vehicle signatures with known classifications. Vehicle signature waveforms of unknown classification obtained from inductive loop sensors are analyzed to identify specific features in the waveform including the number of "peaks", the first peak location and its magnitude. A classifier (e.g., K-nearest neighbor) uses a representation of the vehicle signature and the features to determine from the signature library the classification of the vehicle.

20 Claims, 15 Drawing Sheets

(56) References Cited

PUBLICATIONS

Weinblatt, H., Minge, E., and Petersen, S. (2013). Length-Based Vehicle Classification Schemes and Length Bin Boundaries. In Transportation Research Record: Journal of the Transportation Research Board, No. 2339, Transportation Research Board of the National Academies, Washington, D.C., pp. 19-29.

Coifman, B. and Kim, S. (2009). Speed Estimation and Length based Vehicle Classification from Freeway Single-loop Detectors. Transportation Research: Part C, vol. 17, Issue 4, pp. 349-364.

Coifman, B. (2007). Vehicle Classification from Single Loop Detectors. Report No. MRUTC 05-02, Midwest Regional University Transportation Center, University of Wisconsin, Madison.

Wang, Y. and Nihan, N. L. (2004). Dynamic Estimation of Freeway Large Truck Volumes Based on Single-Loop Measurements. Journal of Intelligent Transportation Systems, vol. 8, Issue 3, pp. 133-141.

Zhang, G., Wang, Y., and Wei, H. (2006). Artificial Neural Network Method for Length based Vehicle Classification using Single-loop Outputs. In Transportation Research Record: Journal of the Transportation Research Board, No. 1945, Transportation Research Board of the National Academies, Washington, D.C., pp. 100-108.

Reijmers, J. J. (1980). On-line Vehicle Classification. IEEE Transactions on Vehicular Technology, vol. 29, Issue 2, pp. 156-161.

Zhang, X., Wang, Y. and Nihan, N. L. (2005). Monitoring a freeway network in real time using single-loop detectors. International Journal of Vehicle Information and Communication Systems, vol. 1, Nos. 1/2, pp. 119-130.

Hernandez, S. V. (2014). Integration of Weigh-In-Motion and Inductive Signature Data for Truck Body Classification. UC Irvine. ProQuest ID: Hernandez_uci_0030D_13124. Merritt ID: ark:/13030/m54n0jwf. Retrieved from https://escholarship.org/uc/item/73137048.

Jeng, S.-T., Chu, L., and Hernandez, S. V. (2013). Wavelet-k Nearest Neighbor Vehicle Classification Approach with Inductive Loop Signatures. Transportation Research Record 2380, pp. 72-80.

Tok, A. and Ritchie, S.G. (2010). Vector Classification of Commercial Vehicles using a High Fidelity Inductive Loop Detection System. In proceedings of the 89h Annual Meeting of the Transportation Research 35 Board, Washington D.C, 2010.

Jeng, S.-T. and Ritchie, S. G. (2008). Real-time Vehicle Classification using Inductive Loop Signature Data. In Transportation Research Record: Journal of the Transportation Research Board, No. 2086, Transportation Research Board of the National Academies, Washington, D.C., pp. 8-22.

Ki, Y. and Baik, D. (2006). Vehicle Classification Algorithm for Single-loop Detectors using Neural Networks. IEEE Transactions on Vehicular Technology, vol. 55, Issue 6, 2006, pp. 1704-1711.

Sun, C., Ritchie, S. G., and Oh, S. (2003). Inductive Classifying Artificial Network for Vehicle Type Categorization. Computer-Aided Civil and Infrastructure Engineering, vol. 18, Issue 3, pp. 161-172.

\* cited by examiner

250

| Station | site 13 |
|---|---|
| VID | 70538 |
| Loop ID | Loop 4 |
| Timestamps | 18:14:13.691 |
| Samples | 805 |
| FHWA VC | 9 |
| Magnitude | 35,36,37,38,39,41,43,44,45,47,49,51,53,56,58,61,64,67,70,73,76,78,81,85,87,90,93,97, 100,104,107,111,115,118,121,123,126,129,131,134,135,137,139,141,142,144,145,146, 147,148,149,151,152,153,154,155,158,160,163,165,166,168,170,174,176,178,180,182, 186,187,189,190,192,194,197,200,201,205,208,210,212,215,217,220,223,227,229,232, 235,237,240,244,245,248,251,254,257,260,262,264,267,269,271,273,276,278,279,281, 283,285,286,288,289,290,291,292,293,292,292,291,290,290,289,288,287,288,287,286, 285,282,281,279,277,275,272,270,267,265,262,259,256,252,249,245,242,238,234,229, 225,221,216,212,208,204,200,196,192,188,184,180,176,172,168,164,160,157,154,150, 147,144,141,138,135,133,130,128,126,125,123,121,119,118,116,114,114,112,111,110, 110,109,109,109,109,109,109,110,110,111,111,112,113,114,116,117,118,120,122,123, 125,127,128,130,132,134,136,138,140,142,144,146,148,150,152,153,155,156,158,159, 161,162,163,164,165,166,167,168,169,170,171,173,175,176,178,180,181,182,184,185, 187,189,190,192,194,196,197,199,201,202,203,204,204,205,205,206,206,206,205,205, 204,203,202,201,200,199,198,196,195,194,192,191,190,188,187,185,184,183,182,181, 180,179,177,177,176,175,174,173,172,171,171,170,169,168,167,166,165,164,162,161, 160,159,158,156,155,154,152,151,149,148,146,145,143,142,140,138,136,133,131,129, 126,124,121,119,117,114,112,110,108,106,104,102,100,99,98,96,95,94,93,93,92,91,91 ,91,90,90,90,91,91,91,92,93,93,94,95,96,98,99,100,102,104,106,107,109,110,112,113, 114,115,116,117,118,118,118,118,118,117,117,116,115,114,112,110,109,107,105,103, 101,100,98,96,95,93,92,90,89,88,87,86,85,84,84,83,83,82,82,82,81,81,81,81,81,81,81, 80,80,80,80,80,80,79,79,79,78,78,78,77,77,76,76,76,75,74,74,73,73,72,72,71,71,70,70, 69,68,68,67,67,66,66,65,65,65,64,64,63,63,63,63,62,62,62,62,62,61,61,61,61,61,61,61, 61,61,61,62,62,62,62,62,62,62,62,62,62,62,62,62,62,62,62,62,62,62,62,62,61,61,61,61, 61,61,61,61,61,61,61,61,61,61,61,61,61,61,61,61,61,61,61,61,61,61,61,61,61,61,61,61, 61,61,61,61,61,61,61,61,61,61,61,61,62,62,62,62,62,62,62,62,62,62,62,63,63,63, 63,63,63,63,63,64,64,64,64,65,65,65,65,66,66,66,66,67,67,68,68,68,69,69,70,70,71,71, 72,72,73,74,74,75,76,76,77,78,79,80,80,81,82,83,84,86,87,88,89,91,92,93,95,96,98,10 0,101,103,105,106,108,110,112,114,116,118,120,122,124,125,127,129,131,133,135,13 7,139,140,142,144,145,147,148,149,151,152,154,155,156,157,158,159,160,161,161,16 2,163,164,164,165,165,166,166,166,166,166,166,166,166,165,165,165,164,164,163,16 3,162,162,161,161,160,159,159,158,157,156,155,155,154,153,152,151,150,149,148,14 7,146,145,144,143,141,140,139,137,136,134,133,131,129,127,126,124,122,120,118,11 6,114,112,111,109,107,105,104,102,100,99,98,96,95,94,93,92,91,90,89,89,88,88,87,87 ,87,87,87,86,87,87,87,87,87,88,88,88,89,89,90,90,90,91,91,92,92,92,93,93,93,93 ,92,92,91,91,90,89,88,86,85,83,81,80,78,76,74,72,70,68,66,63,61,59,57,55,53,51,49,47 ,45,43,41,40,38,36,35 |

FIG. 2D

| Station | site 13 |
|---|---|
| VID | 70538 |
| Loop ID | Loop 4 |
| Timestamps | 18:14:13.691 |
| Samples | 805 |
| FHWA VC | 9 |
| Haar Wavelet Points | 35.0 + 92.8 + 151.9 + 207.5 + 278.2 + 278.2* - 193.5 - 117.1* + 123.8 + 166.4 + 204.0* - 182.7 - 155.7 - 105.7 - 96.2* + 111.9* - 81.0 - 74.0 - 62.0 - 62.0 - 61.0* = 61.0* + 64.6 + 76.0 + 108.9 + 154.5 + 164.0* - 143.8 - 99.7 - 88.1 - 84.9 - 35.0 |

| | 310 |
|---|---|
| *stn* | site1 |
| *VID* | 524442 |
| *l* | Loop1 |
| *t* | 06:54:37.809 |
| *s* | 629 |
| *m* | 12,12,13,14,15,16,18,19,21,23,24,26,28,30,32,35,37,40,42,45,48,51,54,57,61,64,67,71,75,79,83,88,92,97,102,108,113,119,125,131,138,145,152,159,167,175,183,192,200,209,218,228,237,247,257,266,275,284,294,302,311,319,326,333,340,347,353,358,363,367,370,374,377,380,382,384,386,388,390,391,391,392,393,393,393,392,391,390,388,386,383,381,378,375,372,369,366,363,360,357,355,352,349,347,344,342,339,337,334,332,329,326,323,320,317,314,311,308,305,302,299,296,293,290,287,284,281,278,276,273,271,269,267,266,265,264,264,264,265,266,268,270,273,275,278,282,286,291,295,300,305,310,316,322,328,334,339,345,351,357,362,367,372,376,379,383,385,387,388,389,390,389,388,387,385,382,379,375,371,367,362,358,353,348,344,340,336,332,329,327,325,323,321,321,320,321,322,324,326,329,332,335,339,343,346,350,354,358,361,364,367,370,372,374,376,378,379,379,380,380,380,379,379,377,376,374,373,371,368,366,364,362,360,359,357,356,355,354,353,353,353,353,354,355,357,358,361,363,365,368,371,374,377,381,384,387,390,393,396,399,402,404,407,409,410,411,412,413,413,413,413,412,411,410,409,407,405,403,401,399,397,395,393,391,389,388,387,387,387,388,389,390,391,393,396,398,401,403,407,410,414,422,426,431,435,439,443,447,450,453,456,458,460,462,463,464,464,464,463,462,461,460,458,456,454,451,448,446,444,441,438,436,434,432,430,428,426,425,424,423,422,421,421,421,422,423,423,424,426,427,429,431,432,433,435,436,437,437,436,435,434,432,429,425,421,417,412,407,402,396,390,384,378,372,366,359,353,346,339,333,327,321,315,310,305,300,296,292,288,285,283,281,279,277,276,276,275,276,276,278,279,284,286,290,294,298,303,308,314,319,325,331,336,342,346,351,354,357,359,360,360,360,358,356,354,350,346,342,337,333,327,322,316,311,305,300,294,289,283,279,274,269,265,260,256,251,248,243,240,236,233,230,227,225,222,220,218,217,216,214,213,213,213,213,214,214,216,217,219,221,223,225,227,229,232,234,236,238,240,242,244,245,247,248,249,250,251,252,253,254,255,257,258,260,263,265,268,271,274,277,281,289,293,298,302,307,312,317,323,328,334,339,345,351,356,363,368,374,380,385,390,395,399,403,407,411,413,416,417,419,419,419,417,416,413,409,405,400,394,388,381,374,366,357,349,339,329,319,309,299,288,278,267,257,247,23 |

FIG. 3B

| Class 1<br>Motorcycles |  | Class 7<br>Four or more axle, single unit | 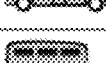 |
| --- | --- | --- | --- |
| Class 2<br>Passenger cars | 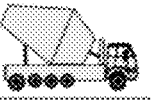 | |  |
| |  | |  |
| |  | Class 8<br>Four or less axle, single trailer |  |
| | 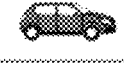 | |  |
| Class 3<br>Four tire, single unit |  | | 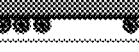 |
| | 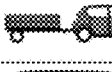 | Class 9<br>5-Axle tractor semitrailer | 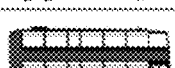 |
| | 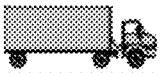 | | 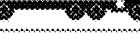 |
| Class 4<br>Buses | 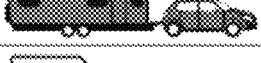 | Class 10<br>Six or more axle, single trailer | 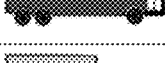 |
| |  | |  |
| | 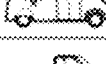 | Class 11<br>Five or less axle, multi trailer | 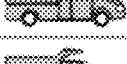 |
| Class 5<br>Two axle, six tire, single unit |  | Class 12<br>Six axle, multi-trailer |  |
| |  | |  |
| |  | Class 13<br>Seven or more axle, multi-trailer |  |
| Class 6<br>Three axle, single unit |  | |  |
| |  | |  |
| |  | |  |

Source: Federal Highway Administration

FIG. 4

| Code 1 | Category (Vehicle Type Code) |
|---|---|
| 0 | Blocked |
| 1 | Motorcycles and Bicycles (FHWA 1) |
| 2 | Passenger cars (FHWA 2) |
| 3 | Light truck (FHWA 3) |
| 4 | Bus (FHWA 4) |
| 5 | Single unit truck (at least six tires) (FHWA 5,6,7) |
| 6 | Single trailer/Combination truck (FHWA 8,9,10) |
| 7 | Multi trailer truck (FHWA 11,12,13) |

FIG. 5A

| Code 2 | Number of axles/wheels |
|---|---|
| 0 | Blocked |
| 1 | If more than 9 axle, code alphanumerically, where 10 axles = A, 11 axles = B, etc |
| 2 | 2 axle (2 wheels for bike or motorcycle) |
| 3 | 3 axle (3 wheels for bike or motorcycle) |
| 4 | 4 axle |
| 5 | 5 axle |
| 6 | 6 axle |
| 7 | 7 axle |
| 8 | 8 axle |
| 9 | 9 axle |

FIG. 5B

Non Truck (Code 1 < 5)

| Code 3 | Body type (Body style) | Code 4 | Specific body type (Specific body style) |
|---|---|---|---|
| 0 | Blocked (may be blocked or N/A) | 0 | N/A |
| 1 | Motorcycles (FHWA1) | 0 | Blocked |
| | | 1 | Moped, Motorcycle |
| | | 2 | 2-front tire motorcycle |
| | | 3 | 2-rear tire motorcycle |
| | | 4 | Sidecar motorcycle |
| | | 9 | Others |
| 2 | Passenger car (FHWA2) | 0 | Blocked |
| | | 1 | Sedan/SUV/Minivan (up to 8 seats)/Coupe/Station wagon/Sports car/Jeep |
| | | 5 | Limousine (e.g., Car limousine, SUV limousine, Hummer limousine) |
| | | 9 | Others |
| 3 | Non passenger car (FHWA3) | 0 | Blocked |
| | | 1 | Pickup, non-full-size |
| | | 3 | Pickup, modified |
| | | 4 | Panel van/Passenger van (9-15 seats) |
| | | 6 | Mini motorhome/Minibus |
| | | 8 | Ambulance |
| | | 9 | Others |
| 4 | Bus (FHWA 4) | 0 | Blocked |
| | | 1 | School, small |
| | | 2 | School, mid/large |
| | | 3 | City bus, small |
| | | 4 | City bus, mid/large |
| | | 5 | City bus, articulated |
| | | 6 | Motorcoach (e.g., Greyhound) |
| | | 7 | Shuttle bus (16 or more seats) |
| | | 9 | Others |
| 9 | Bicycle | 0 | N/A |

FIG. 5C

Truck (Code 1 >= 5) with at least six tires

| Code 3 | Body type (Body style) | Code 4 | Specific body type (Specific body style) |
|---|---|---|---|
| 0 | Blocked | 0 | Blocked |
| 1 | Vans | 0 | Blocked |
| | | 1 | Enclosed van/Open-top/Grain van/Curtain-side/Beverage van |
| | | 2 | Delivery/Multi-stop/Step van |
| | | 3 | Drop-frame van/Furniture van (for Code 1 >= 6 only) |
| | | 4 | Tilt van |
| | | 5 | Same type vans (for Code 1 = 7 only) |
| | | 6 | Different type vans (for Code 1 = 7 only) |
| | | 9 | Others |
| 2 | Platform | 0 | Blocked |
| | | 1 | Basic platform/Double deck platform |
| | | 2 | Low Boy Platform/Gooseneck |
| | | 3 | Platform with device at front end |
| | | 4 | Platform with device at rear end |
| | | 9 | Others |
| 3 | Tank | 0 | Blocked |
| | | 1 | Chemical truck/Gas truck/Septic truck |
| | | 3 | Dry bulk truck/Pneumatic truck |
| | | 9 | Others |
| 5 | Service truck | 0 | Blocked |
| | | 1 | 2-axle 6-tire Pickup |
| | | 2 | Concrete mixer |
| | | 3 | Bucket/Wrecker/Winch |
| | | 4 | Garbage truck |
| | | 5 | Flatbed tow truck (single/Double deck) |
| | | 6 | Crane/Concrete Pumber truck/Oil rig |
| | | 7 | Ambulance/Fire truck |
| | | 9 | Other Utility truck (Landscaping/Street sweeper/etc) |
| 6 | Semi-Tractor | 0 | Blocked |
| | | 1 | Conventional cab/Day cab |
| | | 2 | Extended cab/Sleeping cab |
| | | 3 | Cab-Over Engine (COE) cab |
| | | 9 | Others |
| 7 | Intermodal Chassis | 0 | Blocked |
| | | 1 | 20 ft (1TEU) box container |
| | | 2 | 40 ft (2TEU)/53 ft box container |

FIG. 5D

|   |   | 3 | 20 ft box container on 40 ft chassis |
|---|---|---|---|
|   |   | 4 | Tilt container |
|   |   | 5 | Same type containers (for Code 1 = 7 only) |
|   |   | 6 | Different type containers (for Code 1 = 7 only) |
|   |   | 7 | Container chassis only |
|   |   | 9 | Others |
| 8 | Dump | 0 | Blocked |
|   |   | 1 | End/Side dump |
|   |   | 2 | Bottom dump |
|   |   | 9 | Others |
| 9 | Other specialty | 0 | Blocked |
|   |   | 1 | Auto Carrier |
|   |   | 2 | Mini Motorhome |
|   |   | 3 | Full Size Motorhome |
|   |   | 4 | Livestock |
|   |   | 5 | Logging/Pipe/Pole |
|   |   | 6 | Agriculture |
|   |   | 9 | Others (e.g., Armored personnel carrier) |

FIG. 5D (Cont.)

| Code 5 | Pulling additional part |
|---|---|
| 0 | No additional part |
| 1 | FHWA 2, FHWA 3 pulling a trailer/platform/vehicle/etc |
| 3 | Single unit truck (FHWA 4-7) pulling a FHWA 2/FHWA 3/tractor/single unit truck |
| 5 | Single unit truck (FHWA 4-7) pulling a auto trailer |
| 7 | Single unit truck (FHWA 4-7) pulling a trailer/platform (trailer truck type) |
| 9 | Others |

FIG. 5E

| | | | | | | | | | | |
|---|---|---|---|---|---|---|---|---|---|---|
| FHWA1 | Peak Location | 17 | 19 | 15 | 11 | 13 | 20 | 21 | 9 | 18 | 23 |
| | % Frequency | 24.3% | 22.6% | 20.9% | 8.7% | 6.1% | 3.5% | 3.5% | 1.7% | 1.7% | 1.7% |
| FHWA2 | Peak Location | 15 | 13 | 17 | 19 | 11 | 21 | 14 | 16 | 9 | 23 |
| | % Frequency | 32.9% | 18.1% | 17.4% | 14.5% | 7.5% | 5.3% | 2.0% | 0.8% | 0.5% | 0.4% |
| FHWA3 | Peak Location | 15 | 13 | 11 | 23 | 25 | 21 | 9 | 19 | 14 | 17 |
| | % Frequency | 21.0% | 19.1% | 16.0% | 7.0% | 5.9% | 5.7% | 5.5% | 4.4% | 3.6% | 2.2% |
| FHWA4 | Peak Location | 25 | 23 | 11 | 13 | 14 | 15 | 17 | 8 | 19 | 9 |
| | % Frequency | 8.5% | 8.4% | 8.3% | 6.4% | 6.4% | 5.9% | 5.7% | 5.5% | 5.5% | 4.7% |
| FHWA5 | Peak Location | 7 | 21 | 17 | 15 | 23 | 13 | 11 | 9 | 25 | 19 |
| | % Frequency | 9.7% | 9.7% | 9.7% | 8.1% | 7.6% | 6.3% | 5.7% | 5.6% | 5.4% | 4.4% |
| FHWA6 | Peak Location | 25 | 23 | 21 | 13 | 11 | 19 | 15 | 7 | 17 | 5 |
| | % Frequency | 10.1% | 9.8% | 7.3% | 7.3% | 6.6% | 6.0% | 5.7% | 5.4% | 5.0% | 4.2% |
| FHWA7 | Peak Location | 25 | 19 | 11 | 5 | 13 | 7 | 21 | 9 | 15 | 26 |
| | % Frequency | 9.9% | 8.4% | 6.7% | 6.6% | 5.4% | 5.2% | 5.1% | 4.6% | 4.4% | 3.8% |
| FHWA8 | Peak Location | 19 | 13 | 7 | 17 | 5 | 21 | 25 | 11 | 27 | 12 |
| | % Frequency | 7.0% | 6.4% | 5.8% | 5.6% | 5.5% | 5.3% | 4.9% | 4.9% | 4.3% | 4.1% |
| FHWA9 | Peak Location | 19 | 21 | 5 | 15 | 10 | 9 | 17 | 29 | 8 | 14 |
| | % Frequency | 7.3% | 7.0% | 5.7% | 5.2% | 5.0% | 5.0% | 4.9% | 4.7% | 4.4% | 4.1% |
| FHWA10 | Peak Location | 27 | 17 | 11 | 19 | 21 | 9 | 15 | 5 | 25 | 26 |
| | % Frequency | 7.2% | 7.1% | 6.6% | 6.3% | 5.6% | 4.8% | 4.8% | 4.7% | 4.6% | 4.1% |
| FHWA11 | Peak Location | 19 | 29 | 23 | 5 | 13 | 7 | 11 | 26 | 27 | 25 |
| | % Frequency | 7.7% | 6.7% | 6.0% | 5.6% | 5.5% | 5.4% | 5.1% | 4.5% | 4.3% | 4.1% |
| FHWA12 | Peak Location | 29 | 21 | 27 | 17 | 19 | 11 | 5 | 9 | 7 | 8 |
| | % Frequency | 7.8% | 6.7% | 5.9% | 5.6% | 5.5% | 4.9% | 4.8% | 4.8% | 4.6% | 4.3% |
| FHWA13 | Peak Location | 3 | 12 | 29 | 9 | 27 | 7 | 5 | 21 | 22 | 28 |
| | % Frequency | 6.1% | 6.1% | 6.1% | 5.4% | 5.4% | 4.8% | 4.1% | 4.1% | 4.1% | 4.1% |

FIG. 6A

FHWA 9 peak occurring location frequency

| estPkLoc0 to estPkLoc7 | 0 | 1 | 2 | 3 | 4 | 5 | 6 | 7 |
|---|---|---|---|---|---|---|---|---|
| Frequency | 0 | 37 | 1,136 | 2,069 | 3,547 | 6,434 | 3,449 | 4,344 |
| % frequency | 0.00% | 0.03% | 1.01% | 1.84% | 3.15% | 5.71% | 3.06% | 3.86% |
| estPkLoc8 to estPkLoc15 | 8 | 9 | 10 | 11 | 12 | 13 | 14 | 15 |
| Frequency | 4,904 | 5,651 | 5,668 | 3,427 | 2,637 | 3,801 | 4,625 | 5,800 |
| % frequency | 4.35% | 5.02% | 5.03% | 3.04% | 2.34% | 3.38% | 4.11% | 5.15% |
| estPkLoc16 to estPkLoc23 | 16 | 17 | 18 | 19 | 20 | 21 | 22 | 23 |
| Frequency | 2,479 | 5,472 | 1,286 | 8,261 | 1,349 | 7,878 | 1,893 | 3,887 |
| % frequency | 2.20% | 4.86% | 1.14% | 7.34% | 1.20% | 7.00% | 1.68% | 3.45% |
| estPkLoc24 to estPkLoc31 | 24 | 25 | 26 | 27 | 28 | 29 | 30 | 31 |
| Frequency | 749 | 3,720 | 4,538 | 1,670 | 3,610 | 5,312 | 2,983 | 0 |
| % frequency | 0.67% | 3.30% | 4.03% | 1.48% | 3.21% | 4.72% | 2.65% | 0.00% |

SYSTEM AND METHOD FOR SINGLE-LOOP VEHICLE CLASSIFICATION USING INDUCTIVE LOOP VEHICLE SIGNATURES

GOVERNMENT SUPPORT

This invention was made with government support under contract number DTRT57-14-C-10025 awarded by the Department of Transportation. The government has certain rights in the invention.

BACKGROUND

Inductive loop sensors are currently the most invested and widely deployed traffic detection infrastructure for traffic data collection from highways and traffic signal control in the United States. Inductive Loop Detection (ILD) technology is very reliable and provides accurate traffic count data. Properly installed loop sensors have a service life that is typically comparable to the road surface itself.

When installed in a double loop speed trap configuration, an inductive loop can provide point speed and effective vehicle length information. The double loop sensors are widely applied in Continuous Vehicle Classification (CVC) and Weigh-In-Motion (WIM) sites. However, most of the traffic detection stations are Continuous Count Stations (CCS), which are commonly installed in a single loop configuration that can provide traffic count and occupancy data only.

Vehicle class refers to the classification of a vehicle based on a classification scheme such as the Federal Highway Association (FHWA) 13 vehicle classes summarized in FIG. 4 (*Traffic Monitoring Guide*, FHWA, 2016). Examples of vehicle classes under the FHWA 13 class scheme include "motorcycles", "passenger cars", "buses", and "5-axle tractor semitrailer." Research has been done to obtain vehicle class information from double loop sensors; such approaches depend on the correlation of vehicle lengths with vehicle class (Weinblatt et al., 2013, Coifman and Kim, 2009; Coifman 2007; Zhang et al., 2006; Wang and Nihan, 2004; Reijmers, 1980). Two main problems have been identified with these approaches. First, there is a significant overlap of length distributions across different vehicle types, such as between light trucks and passenger vehicles as well as between buses and single unit trucks. Second, individual vehicle lengths can only be measured accurately using double inductive loop sensors in a speed trap configuration with the requirement of vehicles traversing the speed traps at near constant speeds. If significant acceleration or deceleration is present, significant errors in vehicle length measures can result, rendering the method inaccurate in unstable and congested traffic conditions where such information is most desired.

Since inductive loop sensors in speed trap configurations are not common, researchers have been developing algorithms to estimate the truck traffic using inductive loops installed in the more commonly deployed single loop sensor configuration (Coifman and Kim, 2009; Coifman 2007; Zhang et al., 2005; Wang and Nihan, 2004). However, such methods can only yield an estimate of truck proportions in the traffic flow and do not provide any characteristic details such as truck types. Furthermore, several assumptions have to be made to ensure accurate results (Wang and Nihan, 2004), such as a known constant speed difference between truck and truck-free lanes. Consequently, the aforementioned approaches are not adequate for real-world implementation.

With continuing emphasis on transportation sustainability, there is an increasing need to obtain more accurate and comprehensive traffic performance measures, such as vehicle classification and vehicle miles traveled by vehicle classes. These measures can be used to better understand the impacts of vehicular travel, estimate greenhouse gas emission, and develop effective management strategies to maximize mobility while simultaneously reducing adverse impacts. The emerging inductive loop signature technology provides an alternative solution.

Unlike the conventional ILD systems that provide bivalent outputs to indicate vehicle presence, the inductive loop signature-based detector systems measure and output the inductance changes (referred as "magnitude") of ILDs. The series of inductance changes caused by a traversing vehicle produce an analog waveform output and is referred to as inductive loop signature or inductive vehicle signature. With the availability of inductive loop signature technology, researchers have demonstrated the advantages of using individual vehicle signature to generate vehicle classification using single loop sensors. The signatures' similarities for the same vehicle and among vehicles of the same type are the basis for vehicle classification using the inductive loop signature technology. Researchers (Hernandez et al., 2016; Jeng and Chu, 2013; Tok and Ritchie, 2010; Jeng and Ritchie, 2008; Ki and Baik, 2006; Sun et al., 2003) have shown that the technology possesses the ability to distinguish between passenger and commercial vehicle classes in the FHWA classification scheme.

However, such systems usually provide no more than seven vehicle types (Ki and Baik, 2006; Sun et al., 2003) and are area specific (Tok and Ritchie, 2010; Jeng and Ritchie, 2008; Ki and Baik, 2006). Re-calibration and re-estimation are required when transferring to different traffic detection stations if conditions differ. Even though some studies have shown the potential to classify vehicles into more vehicle types (Hernandez et al., 2016; Jeng and Chu, 2013; Tok and Ritchie, 2010; Jeng and Ritchie, 2008), additional data sources (i.e., WIM data; Hernandez et al., 2016) are required, re-calibration may be needed (Tok and Ritchie, 2010; Jeng and Ritchie, 2008), or performance can be further improved (Jeng and Chu, 2013).

SUMMARY

Single loop inductive sensors are widely deployed in infrastructure for traffic data collection, however, these loops currently provide little more than vehicle detection. A system and method are provided that enable single loop inductive sensors to be used for vehicle classification (e.g., identification as motorcycle, passenger car, bus, etc.). Classification may be done using the Federal Highway Administration's 13 class system, a system proposed herein called CLRVC, or any suitable classification system. Initially a signature library is built from vehicle signatures with known classifications. Vehicle signature waveforms of unknown classification obtained from inductive loop sensors are analyzed to identify specific features in the waveform including the number of "peaks", the first peak location and its magnitude. A classifier (e.g., K-nearest neighbor) uses a representation of the vehicle signature and the features to determine from the signature library the classification of the vehicle.

One aspect relates to a system for classifying vehicles, the system comprising a non-transitory computer readable memory configured to store a classification library having a plurality of entries, each entry in the library having a vehicle classification; a sequence generating module operably connected to an inductive loop sensor for receiving a vehicle signature therefrom, and configured to convert the vehicle signature into a sequence of numbers; an input set generating module operably connected to the sequence generating module for receiving the sequence, and configured to identify peaks in the sequence and to generate an input set, the input set comprising the sequence, a quantity of peaks in the sequence, a location of a first peak in the sequence, and a value of the first peak; a classification module operably connected to the memory for accessing the classification library, operably connected to the input set generating module for receiving the input set, and configured to perform K-nearest neighbor (KNN) classification with the classification library on the input set thereby determining an estimated vehicle classification for the input set; and an output module configured to output the estimated vehicle classification.

In some embodiments, the output module records the estimated vehicle classification to the memory along with the vehicle signature and station data.

In some embodiments, the vehicle classification of each entry in the vehicle signature library is one of 13 Federal Highway Administration classifications.

In some embodiments, the sequence generating module calculates wavelet coefficients for the vehicle signature and forms the sequence by regenerating the vehicle signature using a subset of the wavelet coefficients. In some embodiments, the sequence generating module uses the largest N % of the wavelet coefficients to regenerate the vehicle signature, where N is in the interval [50, 100). In some embodiments, the wavelet coefficients calculated by the sequence generating module are Haar wavelet coefficients, and the sequence has 32 numbers.

In some embodiments, the input set generating module identifies as a peak each number in the sequence where an immediately preceding number is less than said number and an immediately following number is less than said number (+,−), or the immediately preceding number is less than said number and the immediately following number is equal to said number (+,0), or the immediately preceding number is greater than said number and the immediately following number is greater than said number (−,+), or the immediately preceding number is equal to said number and the immediately following number is greater than said number (0,+), or the immediately preceding number is greater than said number and the immediately following number is equal to said number (−,0), or the immediately preceding number is equal to said number and the immediately following number is less than said number (0,−). In some embodiments, the input set generating module identifies the location in the sequence of the first peak as an index of a first number in the sequence identified as a peak, and identifies the value of the first peak as said first number.

In some embodiments, the input set generating module normalizes each number in the input set. In some embodiments, the classification module calculates a Euclidian distance between the input set and each of the plurality of entries in the classification library, identifies K (K a positive integer) smallest Euclidian distance entries, and determines the estimated vehicle classification based on said K entries. In some embodiments, K=1 and the estimated vehicle classification is the vehicle classification of the entry having the smallest Euclidian distance. In some embodiments, K>1 and the estimated vehicle classification is the vehicle classification of a statistical mode of the K smallest entries, wherein if the mode is multivalued, the vehicle classification of the mode having the smallest average distance among its entries is the estimated vehicle classification.

Another aspect relates to a method of classifying vehicles, the method comprising providing a classification library having a plurality of entries, each entry in the library being associated with a vehicle classification; receiving a vehicle signature from an inductive loop sensor; converting the vehicle signature into a sequence of numbers; identifying peaks in the sequence to generate an input set, the input set comprising the sequence, a quantity of peaks in the sequence, a location of a first peak in the sequence, and a value of the first peak; performing a K-nearest neighbor (KNN) classification with the classification library on the input set to determine an estimated vehicle classification for the vehicle signature; and outputting an estimated vehicle classification obtained from the KNN classification.

In some embodiments, the vehicle is classified as one of 13 Federal Highway Administration classifications.

In some embodiments, converting the vehicle signature into a sequence comprises calculating wavelet coefficients for the vehicle signature and regenerating the vehicle signature using a subset of the wavelet coefficients. In some embodiments, the subset of the wavelet coefficients used are the largest N % of the wavelet coefficients, where N is in the interval [50, 100). In some embodiments, the wavelet coefficients are Haar wavelet coefficients, and the sequence has 32 numbers.

In some embodiments, identifying peaks in the sequence comprises identifying as peaks each number in the sequence where an immediately preceding number is less than said number and an immediately following number is less than said number (+,−), or the immediately preceding number is less than said number and the immediately following number is equal to said number (+,0), or the immediately preceding number is greater than said number and the immediately following number is greater than said number (−,+), or the immediately preceding number is equal to said number and the immediately following number is greater than said number (0,+), or the immediately preceding number is greater than said number and the immediately following number is equal to said number (−,0), or the immediately preceding number is equal to said number and the immediately following number is less than said number (0,−). In some embodiments, the method further comprises identifying the location of the first peak in the sequence as the location of a first number in the sequence identified as a peak; and identifying the value of the first peak as said first number.

In some embodiments, each number in the input set is normalized. In some embodiments, performing KNN classification comprises calculating a Euclidian distance between the input set and each of the plurality of entries in the classification library, identifying K (K a positive integer) entries having the smallest Euclidian distance, and determining the estimated vehicle classification based on said K entries. In some embodiments, K=1 and the estimated vehicle classification is the vehicle classification of the entry having the smallest Euclidian distance. In some embodiments, K>1 and the estimated vehicle classification is the vehicle classification of a statistical mode of the K smallest entries, wherein if the mode is multivalued, the vehicle classification of the mode having the smallest average distance among its entries is the estimated vehicle classification.

Yet another aspect relates to a method for generating a vehicle classification library, the method comprising receiving a plurality of training examples, each training example having a vehicle signature from an inductive loop sensor and a vehicle classification; grouping the training examples having a same vehicle classification; and for each group (i) generating a set of library inputs by, for each of the training examples in the group, (A) converting the vehicle signature into a sequence; (B) identifying peaks in the sequence; (C) calculating a library input comprising a quantity of peaks in the sequence, a location of a first peak in the sequence, a value of the first peak, and values of said sequence at select peak locations; (ii) clustering library inputs in the set of library inputs into K clusters using a K-means clustering; (iii) creating a library entry for each cluster by (A) averaging the value of the location of the first peak among the library inputs in said cluster; (B) averaging the value of the first peak among the library inputs in said cluster; (C) averaging the value of the number of peaks among the library inputs in said cluster; and (D) averaging the sequences corresponding to the library inputs in said cluster at each position in the sequences; and (iv) adding the library entry to a vehicle classification library.

In some embodiments, the method further comprises: receiving an unclassified vehicle signature from an inductive loop sensor; representing the unclassified signature as an unclassified sequence; identifying peaks in the unclassified sequence; performing a K-nearest neighbor (KNN) classification with the vehicle classification library on an input set to determine an estimated vehicle classification for the unclassified vehicle signature, the input set comprising the unclassified sequence, a quantity of peaks in the unclassified sequence, a location of a first peak in the unclassified sequence, and a value of the first peak; and storing the estimated vehicle classification with the unclassified vehicle signature and station data in a non-transient, computer-readable memory device.

In some embodiments, identifying peaks in the sequence comprises identifying as peaks each number in the sequence where an immediately preceding number is less than said number and an immediately following number is less than said number (+,−), or the immediately preceding number is less than said number and the immediately following number is equal to said number (+,0), or the immediately preceding number is greater than said number and the immediately following number is greater than said number (−,+), or the immediately preceding number is equal to said number and the immediately following number is greater than said number (0,+), or the immediately preceding number is greater than said number and the immediately following number is equal to said number (−,0), or the immediately preceding number is equal to said number and the immediately following number is less than said number (0,−).

In some embodiments, each group is for one of 13 Federal Highway Administration vehicle classifications.

In some embodiments, representing the vehicle signature as a sequence comprises calculating wavelet coefficients for the vehicle signature and regenerating the vehicle signature using a subset of the wavelet coefficients. In some embodiments, the subset of the wavelet coefficients used are the largest N % of the wavelet coefficients, where N is in the interval [50, 100). In some embodiments, the wavelet coefficients are Haar wavelet coefficients, and the sequence has 32 numbers.

In some embodiments, the select peak locations are the 4 or more most frequent peak locations for vehicle signatures within a vehicle classification.

In some embodiments, each group is for one Federal Highway Administration vehicle classification, and the select peak locations are the 4 or more most frequent peak locations for vehicle signatures having a same CLRVC.

In some embodiments, each group is for one CLRVC vehicle classifications, and the select peak locations are the 4 or more most frequent peak locations for vehicle signatures having a same vehicle classification.

Another aspect relates to a system for generating a vehicle classification library, the system comprising: a non-transitory computer readable memory storing a plurality of training examples, each training example having a vehicle signature from an inductive loop sensor and a vehicle classification; a grouping module configured to group training examples having a same vehicle classification; and a generating module to generate for each group a set of inputs by, for each training example in the group, (i) converting the vehicle signature into a sequence, (ii) identifying peaks in the sequence, and (iii) forming an input containing (A) a quantity of peaks in the sequence, (B) a location of a first peak in the sequence, (C) a value of the first peak, and (D) values of said sequence at select peak locations; a clustering module configured to receive the set of inputs for a group from the generating module and use K-means clustering to organize the inputs of said set into K clusters; a library module configured to create a library entry for each cluster by (i) averaging the value of the location of the first peak among the inputs in said cluster, (ii) averaging the value of the first peak among the inputs in said cluster, (iii) averaging the value of the quantity of peaks among the inputs in said cluster, and (iv) averaging the sequences corresponding to the inputs in said cluster at each position in said sequences; and a recording module to add each library entry created by the library module to the vehicle classification library.

In some embodiments, the generating module identifies as a peak each number in the sequence where an immediately preceding number is less than said number and an immediately following number is less than said number (+,−), or the immediately preceding number is less than said number and the immediately following number is equal to said number (+,0), or the immediately preceding number is greater than said number and the immediately following number is greater than said number (−,+), or the immediately preceding number is equal to said number and the immediately following number is greater than said number (0,+), or the immediately preceding number is greater than said number and the immediately following number is equal to said number (−,0), or the immediately preceding number is equal to said number and the immediately following number is less than said number (0,−).

In some embodiments, each group is for one of 13 Federal Highway Administration vehicle classifications.

In some embodiments, to convert the vehicle signature into the sequence, the generating module is configured to calculate wavelet coefficients for the vehicle signature and regenerate the vehicle signature using a subset of the wavelet coefficients. In some embodiments, the subset of the wavelet coefficients used are the largest N % of the wavelet coefficients, where N is in the interval [50, 100). In some embodiments, the wavelet coefficients are Haar wavelet coefficients, and the sequence has 32 numbers.

In some embodiments, the select peak locations are the 4 or more most frequent peak locations for vehicle signatures within the group.

In some embodiments, each group is for one Federal Highway Administration vehicle classification, and the select peak locations are the 4 or more most frequent peak locations for vehicle signatures having a same CLRVC.

In some embodiments, each group is for one CLRVC vehicle classification, and the select peak locations are the 4 or more most frequent peak locations for vehicle signatures having a same vehicle classification.

In some embodiments, the recording module is further configured to store the vehicle classification library in the memory, and the system further comprises a sequence generating module operably connected to an inductive loop sensor for receiving an unclassified vehicle signature therefrom, and configured to convert the unclassified vehicle signature into an unclassified sequence; an unclassified input set generating module operably connected to the sequence generating module for receiving the unclassified sequence, and configured to identify peaks in the unclassified sequence and to generate an unclassified input set, the unclassified input set comprising the unclassified sequence, a quantity of peaks in the unclassified sequence, a location of a first peak in the unclassified sequence, and a value of the first peak in the unclassified sequence; a classification module operably connected to the memory for accessing the vehicle classification library, operably connected to the unclassified input set generating module for receiving the unclassified input set, and configured to perform K-nearest neighbor (KNN) classification with the vehicle classification library on the unclassified input set thereby determining an estimated vehicle classification for the unclassified input set; and an output module configured to output the estimated vehicle classification.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 2D shows a table showing the training example after processing by a data processing module, according to some embodiments;

FIG. 3B shows an example input data for the system of FIG. 3A;

FIG. 4 shows the 13 Federal Highway Administration vehicle classifications;

FIGS. 5A-5E show the CLRVC vehicle classification;

FIG. 6A shows a table of largest 10 peak location frequencies for an example dataset that was processed to produce 32 Haar wavelet points;

DETAILED DESCRIPTION

The inventors have recognized and appreciated that there exists an opportunity to improve vehicle classification accuracy obtained from single loop vehicle signatures from inductive loop sensors. Additionally, the inventors have recognized and appreciated that such a vehicle classification system need not require re-calibration and re-estimation when applied to a different location if no new vehicle types are introduced to the system. (If new vehicles are introduced at an existing or different location, some re-estimation may be necessary as discussed further below.)

The vehicle classification system obtains vehicle signatures from single loop sensors. The single loop sensor response is preprocessed to identify vehicle signatures, eliminate noise, and prepare the detected signatures for subsequent analysis. A discrete wavelet transform is applied to the vehicle signature to generate Haar wavelet points. The inventors have recognized and appreciated that certain features of the Haar wavelet points are highly effective in estimating the vehicle class of the vehicle associated with the vehicle signature. These features of the Haar wavelet are input to a KNN ("k-nearest neighbor") classifier. The classifier uses a vehicle signature template library (VSTL) based on training examples (i.e., training vehicle signatures) that have been clustered using a different set of features.

The use of different features in the clustering of the training examples for the vehicle signature template library as compared to the features used for the KNN clustering algorithm significantly enhances transferability of the system, substantially eliminating the need for re-calibration and re-estimation of the system for different locations.

Figure 1:
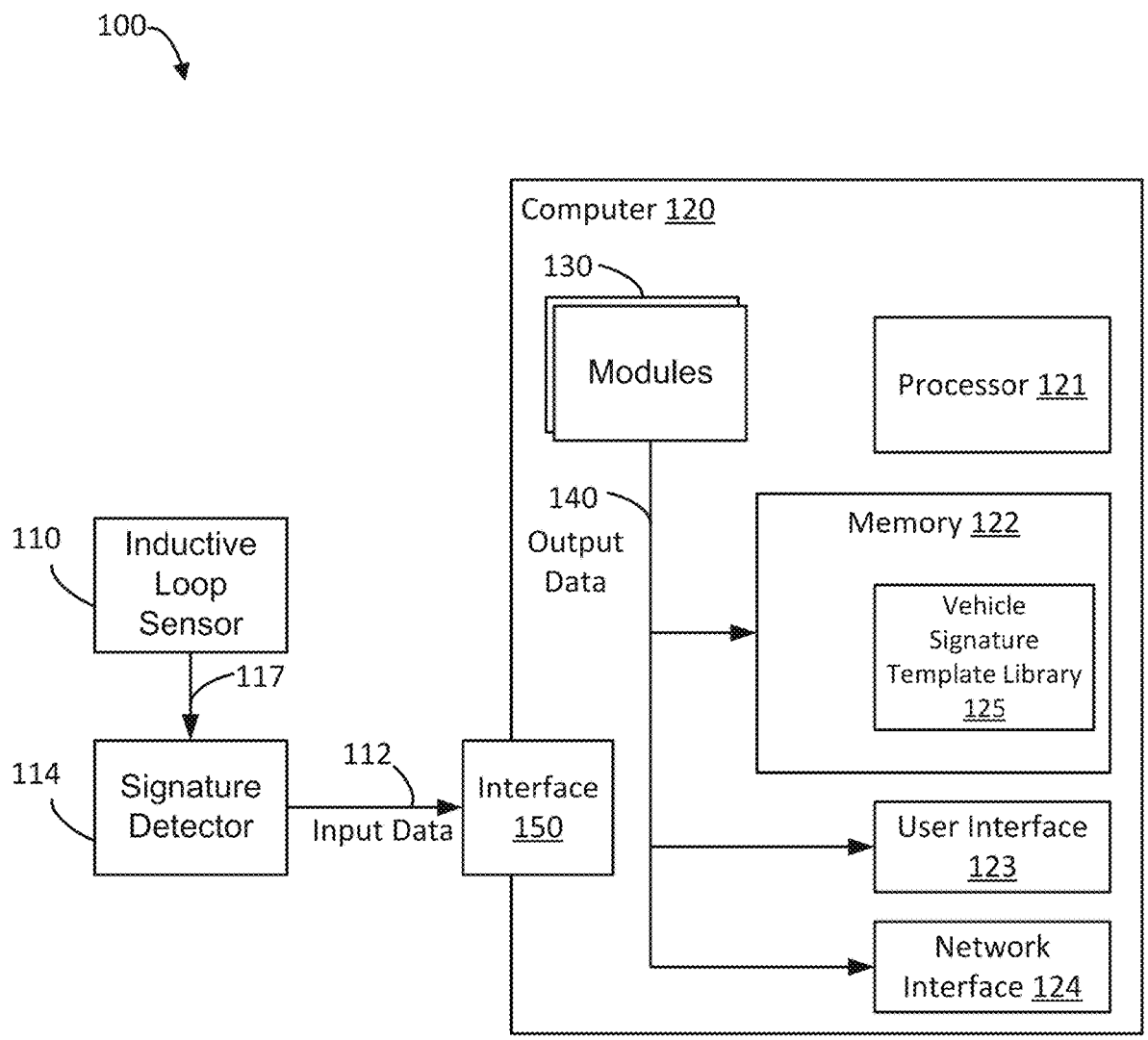
FIG. 1 shows a block diagram of vehicle classification system for single-loop vehicle classification using inductive loop vehicle signatures, according to some embodiments.

FIG. 1 provides a block diagram of vehicle classification system 100 for single-loop vehicle classification using inductive loop vehicle signatures. According to some embodiments, system 100 includes an inductive loop sensor (ILS) 110, signature detector 114, and a computer 120.

ILS 110 is any suitable inductive loop sensor such as a single loop ILS. In some embodiments, ILS 110 is an inductive loop detector that has a 6-×6-ft square loop (or thereabout), or a 6-ft diameter round loop (or thereabout). Though, any suitable ILS may be used. ILS 110 may be embedded or otherwise provided in/on a roadway which receives vehicular traffic. In multi-lane roadways, for example, inductive loop sensors may be provided for each lane, or one inductive loop sensor may be provided for several lanes. Some systems 100 can have inductive loop sensors installed at multiple locations along a roadway.

The response 117 of ILS 110 may be one or more time varying signals (for example, a voltage or current signal). The temporal shape of response 117 may depend upon the type of ILS, the presence and position of a vehicle, the type of vehicle, the speed of the vehicle, and other potential factors.

Signature detector 114 includes instrumentation for measuring a response 117 of ILS 110. In some embodiments, signature detector 114 includes an advanced signature detector card, such as, the I-Loop Duo Signature Detector Card commercially available from CLR Analytics, Inc. of California (http://clranalytics.com/content/i-loop-duo-signature-detector-card). Detector 114 may convert an analog response of ILS 110 to digital data. Detector 114 provides input data 112 (e.g., the digital data converted from the analog response of ILS 110) to computer 120 through interface 150. Interface 150 is any suitable hardware interface for receiving input data 112. In some embodiments, detector 114 provides a stream of measurements from ILS 110 as input data 112 to computer 120 which processes the data to identify vehicle signatures. In some other embodiments, detector 114 pre-processes input data 112 to identify and parse vehicle signatures from each other and non-vehicle responses (e.g., data collected when no vehicle is proximate to ILS 110). Detector 114 may send these parsed vehicle signatures as input data 112 to computer 120. In some other embodiments, a parsing module (e.g., one of modules 130) may be used to parse the ILS response into vehicle signature packages. Each parsed vehicle signature represents a single vehicle passing over ILS 110. The vehicle signature may be parsed by creating a window about a temporal region of the ILS sensor response that meets certain parsing criteria. For example, a vehicle signature may be defined as the temporal period during which response 117 exceeds a set threshold plus a certain temporal amount of adjacent response. Though, any suitable algorithm may be used to parse vehicle signatures from response 117. Whether detector 114 or a module of computer 120 parses the ILS response into vehicle signatures is not critical.

Input data 112 may include additional information generally referred to as station data identifying the road, lane, ILS, date and time, and/or other information. This information may be provided by detector 114 or added by computer 120.

Computer 120 is used to analyze input data 112 and provide output data 140 which includes a vehicle classification estimate. Computer 120 may include a processor 121, memory 122, user interface 123, network interface 124, and modules 130. Computer 120 may be used to execute functional modules 130 as well as certain functions described in connection with signature detector 114. The representation of certain components being within computer 120 and other being outside computer 120 is particular to the illustrated embodiment. It should be appreciated that other configurations are also contemplated. Further, the notion of a computer is used broadly, and it is not critical whether computer 120 is implemented in a single device (e.g., a network-enabled standalone personal computer), a network of devices (e.g., a computer cluster), or in another suitable configuration (e.g., one or more virtual machines executed on one or more server devices).

Processor 121 may be configured to control system 100 and may be operatively connected to memory 122. Processor 121 may be any suitable processing device, physical or virtual, such as for example and not limitation, a central processing unit (CPU), digital signal processor (DSP), controller, addressable controller, general or special purpose microprocessor, microcontroller, addressable microprocessor, programmable processor, programmable controller, dedicated processor, dedicated controller, or any suitable processing device. In some embodiments, processor 121 comprises one or more processors. For example, processor 121 may have multiple cores, be comprised of multiple microchips, or distributed over a communications network.

Memory 122 may be integrated into processor 121 and/or may include "off-chip" memory that may be accessible to processor 121, for example, via a memory bus (not shown).

Memory 122 may store software modules that when executed by processor 121 perform desired functions. Additionally memory 122 may store a vehicle signature template library (VSTL) 125 which may be used as a library for KNN classification. Memory 122 may be any suitable type of non-transient, computer-readable storage medium, for example and not limitation, read-only-memory (RAM), a nanotechnology-based memory, one or more floppy disks, compact disks, optical disks, volatile and/or non-volatile memory devices, magnetic tapes, flash memories, hard disk drive, circuit configurations in Field Programmable Gate Arrays (FPGA), or other semiconductor devices, or other tangible, non-transient computer storage medium.

User interface 123 may include devices for interacting with a user. These devices may include, by way of example and not limitation, keypad, pointing device, camera, display, touch screen, audio input, and audio output.

Network interface 124 may be any suitable combination of hardware and software configured to communicate over a network. For example, network interface 124 may be implemented as a network interface driver and a network interface card (NIC). The network interface driver may be configured to receive instructions from other components of computer 120 to perform operations with the NIC. The NIC provides a wired and/or wireless connection to the network. The NIC is configured to generate and receive signals for communication over a network. In some embodiments network interface 124 is used as interface 150 to receive input data 112. In some embodiments, computer 120 is distributed among a plurality of networked computing devices. Each computing device may have a network interface for communicating with other computing devices forming computer 120.

Computer 120 may have one or more functional modules 130. Modules 130 may operate to perform specific functions such as processing and analyzing data. Modules 130 may be implemented in hardware, software, or any suitable combination thereof. Memory 122 of computer 120 may store computer-executable software modules that contain computer-executable instructions. For example, one or more of modules 130 may be stored as computer-executable code in memory 122. These modules may be read or retrieved from memory 122 for execution by processor 121. Such software may be created any suitable way. For example, the software code may be written using one or more programming languages. The software code may be compiled as executable machine language code or intermediate code that is executable on a virtual machine.

One or more such modules 130 may be used to generate output data 140 including a vehicle classification estimate. Output data 140 may be provided to memory 122 for storage (e.g., for subsequent analysis), to an output device of user interface 123, or communicated to a remote computer over a computer network using network interface 124. Though, output data 140 may be used in any suitable way.

Vehicle signature template library (VSTL) 125 is used to implement KNN classification of the vehicle signatures. VSTL 125 may be generated using a K-means clustering algorithm from a set of training examples. The training examples are vehicle signatures having known classifications.

Figure 2A:
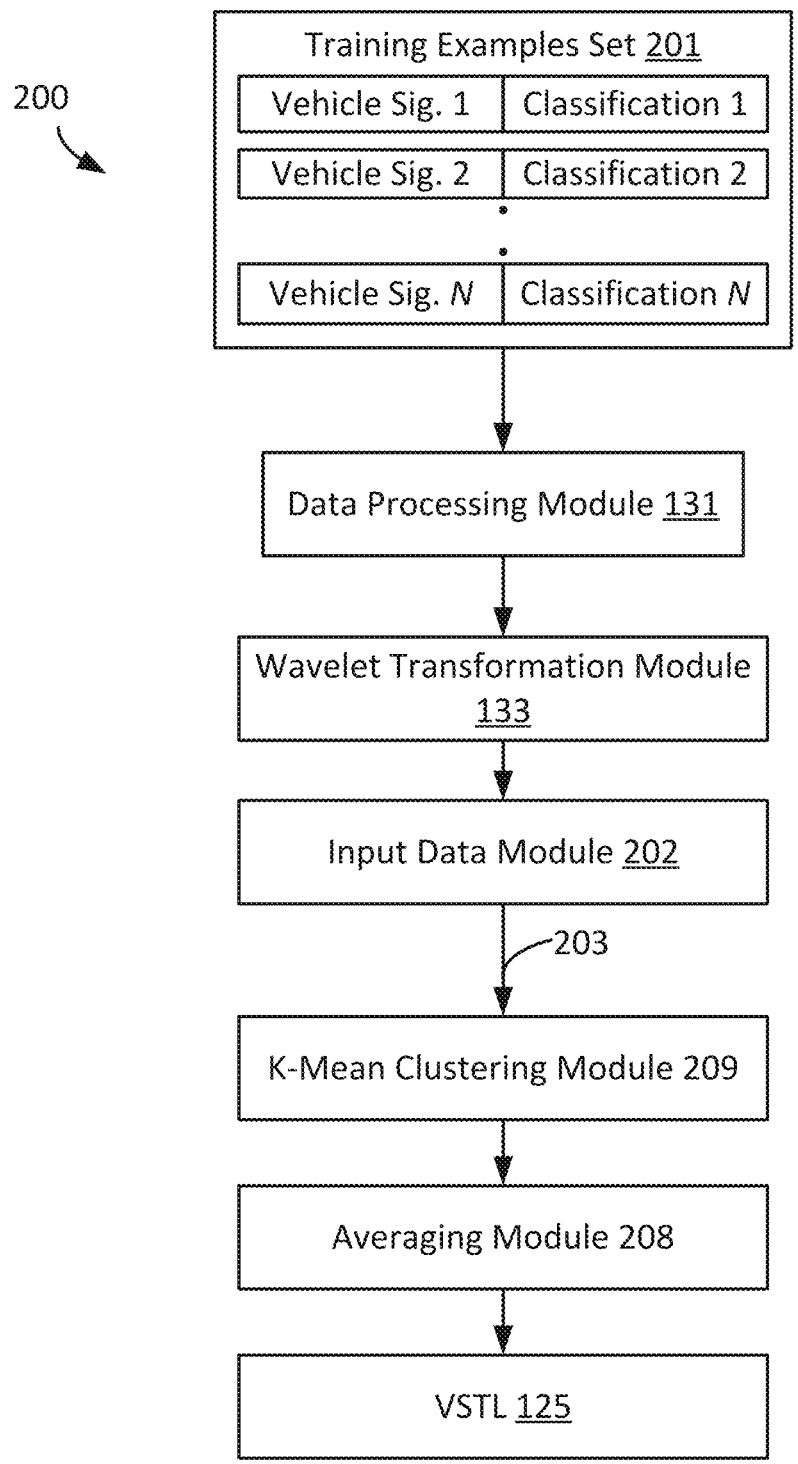
FIG. 2A shows a system for generating a vehicle signature template library (VSTL) from a set of training examples, according to some embodiments.

FIG. 2A shows a system 200 for generating VSTL 125 from a training examples set 201. The modules of system 200 may be implemented as functional modules 130 as part of computer 120 in FIG. 1. Though system 200 may be implemented in any suitable way.

Training examples set 201 contains any suitable number of training examples, (represented as N in the figure). For example, 2,000 or more training examples in each class may be sufficient to provide adequate results under most circumstances. A smaller number may be adequate in some circumstances.

Each training example in set 201 contains a vehicle signature and the known classification of the vehicle. The vehicle signature is the signature waveform obtained for a vehicle from an ILS signature detector, such as ILS 110 in FIG. 1. Classification may be performed based on "ground truth data," that is a different data source than the signature waveform. For example, vehicles classifications for each training example may be determined and/or confirmed based on video evidence.

Any suitable vehicle classification scheme may be used to classify vehicles. One such system is the FHWA classification system summarized in FIG. 4. Another classification scheme, called "CLRVC", uses a five-digit code to classify each vehicle. FIGS. 5A-5E provide tables that define each CLRVC digit. The CLRVC can be converted to other classification schemes such as the four-digit code defined by the FHWA *Traffic Monitoring Guide* (FHWA, 2016) or the FHWA 13 vehicle classifications.

In some embodiments, system 200 is used to process training examples on a per class basis. For example, K-mean clustering may be applied to all training examples of a given class and each class is processed by system 200 separately. The results of system 200 for each class may then be combined to form VSTL 125. In one embodiment, the 13 FHWA classes are each processed separately by system 200. In some embodiments, the training examples are assigned to a CLRVC class and (either explicitly or implicitly) to a FHWA class. System 200 then processes the training examples by FHWA class (which include several CLRVC classes). For example, FHWA Class 2 includes CLRVC classes 22210, 22211, and 22290.

Prior to performing K-mean clustering each vehicle signature in training example set 201 is transformed into clustering input data 203. Initially, data processing module 131 preprocesses the training example vehicle signatures. Data processing module 131 determines if the data is representative of a vehicle passing over ILS 110 or if it is not. The latter is considered "noise" and is filtered out; no further processing is performed on such packages of training examples 201. Module 131 may use any suitable filtering process to evaluate training examples 201. For example, a package of training examples may be considered "noise" if the number of data points in the signature is smaller than a set threshold or if the greatest magnitude of vehicle signature is smaller than another set threshold. (This feature of module 131 may not be needed as part of library generation since such filtering may in effect be done as part of assigning a vehicle classification based on ground truth data.)

If module 131 has sufficient confidence that the vehicle signature in a given package of training examples 201 is for a vehicle, then a noise threshold, 0.1, is applied to remove the front and rear tails within a normalized version of the signature, which are most easily affected by external factors. The normalized signature, $m_n$, is the vehicle signature scaled in amplitude between 0 and 1. The normalized signature, $m_n$, can be found by equation [1]:

$$m_n = \frac{m - m(i_{min})}{m(i_{max}) - m(i_{min})}$$ [1]

Where m is a vector of the data points in the vehicle signature, $i_{max}$ is the index of an entry of m where m has the greatest magnitude and $i_{min}$ is the index of an entry of m where m has the smallest magnitude. Of course, in case of multiple points in m sharing the greater (or smallest) magnitude, any of such points may be chosen as $i_{max}$ (or $i_{min}$). For the front tail of the normalized signature, starting from the first data point, the data point will be removed if the normalized magnitude is smaller than the noise threshold (i.e., 0.1). For the end tail of the normalized signature, starting from the last data point, the data point will be removed if the normalized signature is smaller than the noise threshold. The process will stop once the normalized signature is greater than or equal to the noise threshold. While a noise threshold of 0.1 is used in this embodiment, it should be appreciated that any suitable number between 0 and 1 may be used (e.g., 0.05, 0.15, 0.2). Having too large a threshold, for example above 0.2 in some embodiments, may have negative impact to the classification accuracy.

Figure 2B:
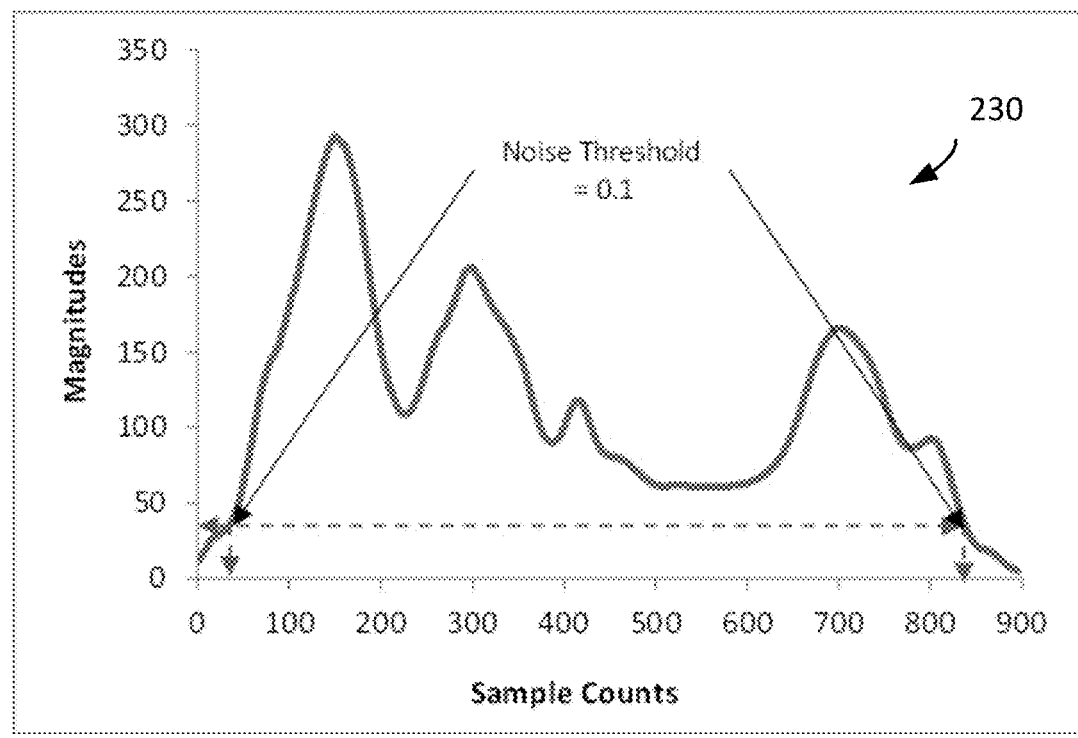
FIG. 2B shows a vehicle signature from an inductive loop for a training example.
Figure 2C:
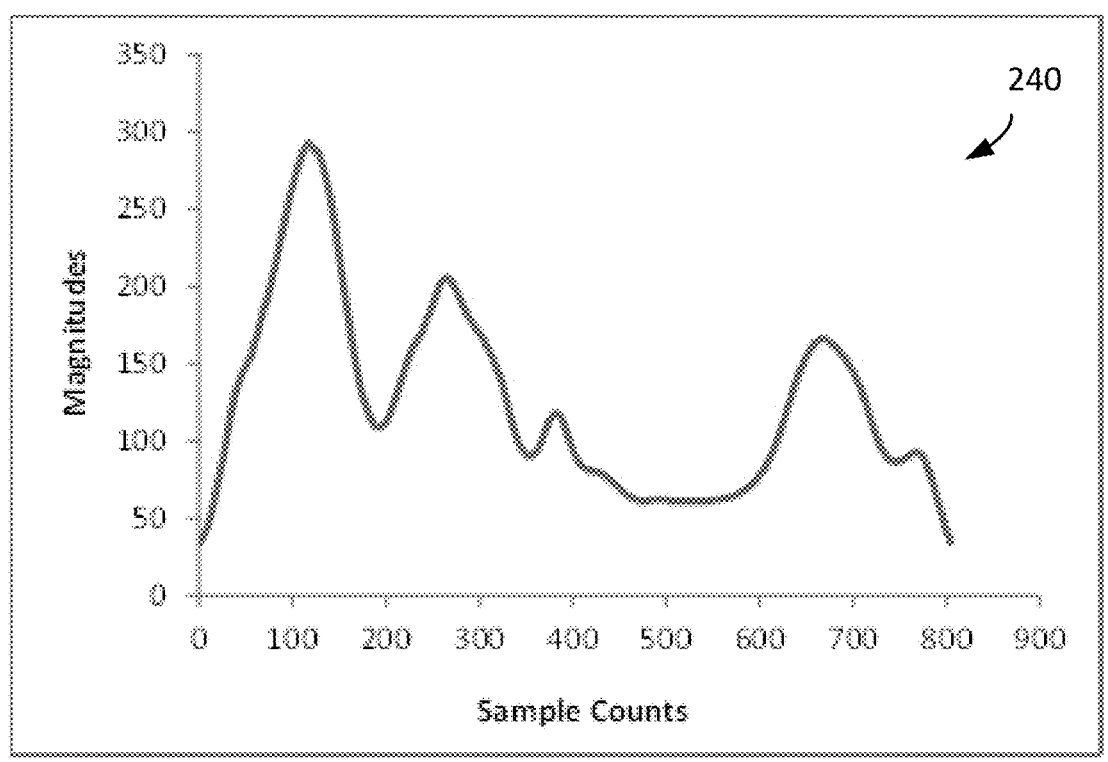
FIG. 2C shows the example vehicle signature after processing by a data processing module, according to some embodiments.

FIG. 2B shows plot 230 of an example vehicle signature waveform prior to processing by module 131. Note that the number of data points is 895, which is determined by the sampling rate of signature detector 114, the parsing algorithm, and the amount of time the vehicle was in the sensitivity range of the ILS (proportional to the speed of the vehicle). FIG. 2C shows plot 240 of the same vehicle signature after processing by module 131; note the number of date points has been reduced to 805. Note also that normalization was done to identify the tails and that the magnitude of the remaining points are not changed.

FIG. 2D shows a table of values 250 for this training example vehicle signature after processing by module 131. In addition to the vehicle signature magnitudes and number of samples, additional information includes the vehicle class or truth data (here the FHWA classification is used), and other information to identify the location and vehicle.

After processing by module 131, wavelet transformation module 133 further processes the training example vehicle signature to produce a set of wavelet points. In this exemplary embodiment, the Haar 2 wavelet (i.e., the second Haar wavelet family member, $\psi_{1,0}=\psi(2x)$, where $\psi_{j,k}(x)=\psi(2^j x-k)$) at level 8 decomposition is used to produce 32 Haar wavelet points, $W=[W_0, W_1, \ldots, W_{31}]$. In other embodiments, other mother wavelets and decomposition levels may be used to generate the wavelet points. For example, Haar 2 wavelet at level 7 decomposition, Haar 2 wavelet at level 9 decomposition, Daubechies 4 wavelet, and Daubechies 6 wavelet may also be applied to generate the wavelet points. Note that Haar wavelet decomposition requires the vehicle signature have $2^n$ points (where n is an integer equal to or greater than the level of decomposition). This may require interpolation of the vehicle signature if it has a different number of points.

Once the wavelet coefficients are calculated, the set of wavelet points are determined using only some of the wavelet coefficients. That is, in some embodiments only the wavelets with the largest coefficients are used to generate the wavelet points. For example, 50%, 60%, 70%, 80%, or 90% of the wavelets may be used by selecting those wavelets with the largest coefficients. In other embodiments, 90%-95% of the wavelets are used to generate the wavelet points.

Figure 2E:
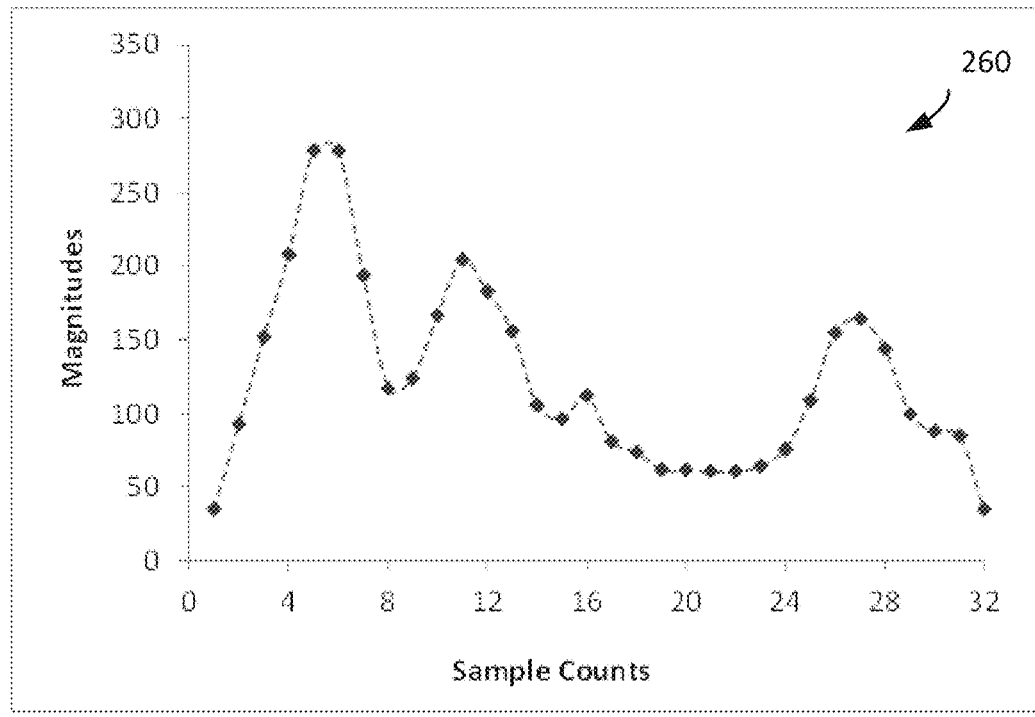
FIG. 2E shows the example vehicle signature represented by 32 Haar wavelet points after processing by a wavelet transformation module and the corresponding table for the training example, according to some embodiments.

FIG. 2E shows a plot 260 of the 32 Haar wavelet points for the training example discussed in connection with FIGS. 2C-2E. These wavelet points were generated using the largest (in terms of coefficients) 90% of the wavelets. A table 261 of the 32 Haar wavelet points is also provided.

From the wavelet points generated by module 133, input data module 202 generates clustering input data 203. For each training example, module 202 determines (a) the estimated number of signature waveform peaks, estPks; (b) the first signature waveform peak location, fPkLoc; (c) the first signature waveform peak value, fPkV; (d) X estimated signature waveform peak locations, estPkLoc$_m$ for each vehicle class; and (e) X normalized Haar wavelet points, HAAR$_m$, corresponding to the peak locations defined by estPkLoc$_m$. The wavelet points are normalized in the same manner using equation [1]. Here X may be any suitable number such as 5, 6, 7, 8, 9, 10, 11, 12, 13, 14, 15, and the like.

The estimated number of signature waveform peaks, estPks, is obtained through identifying local maximum and minimum points among the normalized wavelet points as estimated waveform peaks. In some embodiments, the peaks are estimated using the signs of the first order derivative with the following counted as peaks: (i) change from positive to negative [+,−], (ii) changes from positive to zero [+,0], (iii) changes from negative to positive [−,+], (iv) changes from zero to negative [0,−], (v) change from zero to positive [0,+], and (vi) changes from negative to zero [−,0]. The peaks position and value is that of the middle of the three positions needed to calculate the two derivatives.

For example, consider the sequence 1, 3, 3, 5, 6, 6, 6, 4, 2, 2, 3, 4, 7, 3, 1, 1, 1. The signs of the derivatives are +, 0, +, +, 0, 0, 0, +, +, +, 0, 0. Thus representing the peaks in the sequence with the symbol * we have 1, 3*, 3*, 5, 6*, 6, 6*, 4, 2*, 2*, 3, 4, 7*, 3, 1*, 1, 1.

The identified peaks are counted. In some embodiments, the total is scaled (i.e., divided by) the maximum possible value of the estimated number of signature waveform peaks. In the example embodiment shown in plot 260 (FIG. 2E) there are 32 Haar wavelet points. Using the above algorithm for peak identification the maximum number of peaks is 30 (i.e., 32 Haar-wavelet points−2=30).

The 32 Haar wavelet points for the example vehicle signature shown in plot 260 (FIG. 2E) contains 8 peaks. Note that the sign of the sign of the derivatives (i.e., "+", "−", or "0") indicated in table 261 were determined prior to rounding. The peaks are indicated by the symbol *. For this example, estPks=8/30=0.2$\overline{6}$.

The first signature waveform peak location, fPkLoc, is identified by the index of the first peak location. How the Haar wavelet points are indexed is not critical, here we assume the points are indexed sequentially starting with zero (i.e., 0, 1, 2, 3 . . . ). The index may be scaled using the maximum possible location value of the first signature wavelet peak location point or the range of Haar wavelet points. For example, with 32 Haar wavelet points this range is 31. In the example shown in plot 260 (FIG. 2E) the first signature peak is at index 5, hence fPkLoc=5/31=0.161290.

The first signature waveform peak value, fPkV, is simply the value of the normalized Haar wavelet point at the first signature waveform peak location. In the example shown in plot 260 (FIG. 2E), the first signature peak value is 278.2, which is the maximum value of the set. With normalization applied fPkV=1.0.

The top X estimated signature waveform peak locations, estPkLoc$_m$, are obtained from finding the X most frequently occurring locations for each vehicle class. Thus, each vehicle signature in the same vehicle class will have the same estPkLoc$_m$. In some embodiments, even though the VSTL is being generated for FHWA 13 classes, CLRVC may be used to determine estPkLoc$_m$.

The peak occurring location frequency for each FHWA class is calculated by Equation [2]:

$$estPkLoc_m = \Sum_{i=1}^{F_j} estPkLoc_m^i \qquad [2]$$

Where m=0, 1, . . . , 31; $F_j$=total number of vehicles in FHWA class j. The estPkLoc$_m$ can be equal to 0 if no peak is occurred at location m. The number of estPkLoc$_m$ that is greater than 0 is defined as estPkX.

If estPkX (prior to normalization) is equal to X, the X locations will be selected.

If estPkX (prior to normalization) is less than X, a similarity search using Levenshtein distance among signature peak profiles within the same vehicle class will be performed and the closest profile will be applied as the array estPkLoc$_m$.

If estPkX (prior to normalization) is greater than X, the X most frequently occurring locations will be selected.

Figures 6B, 6C:
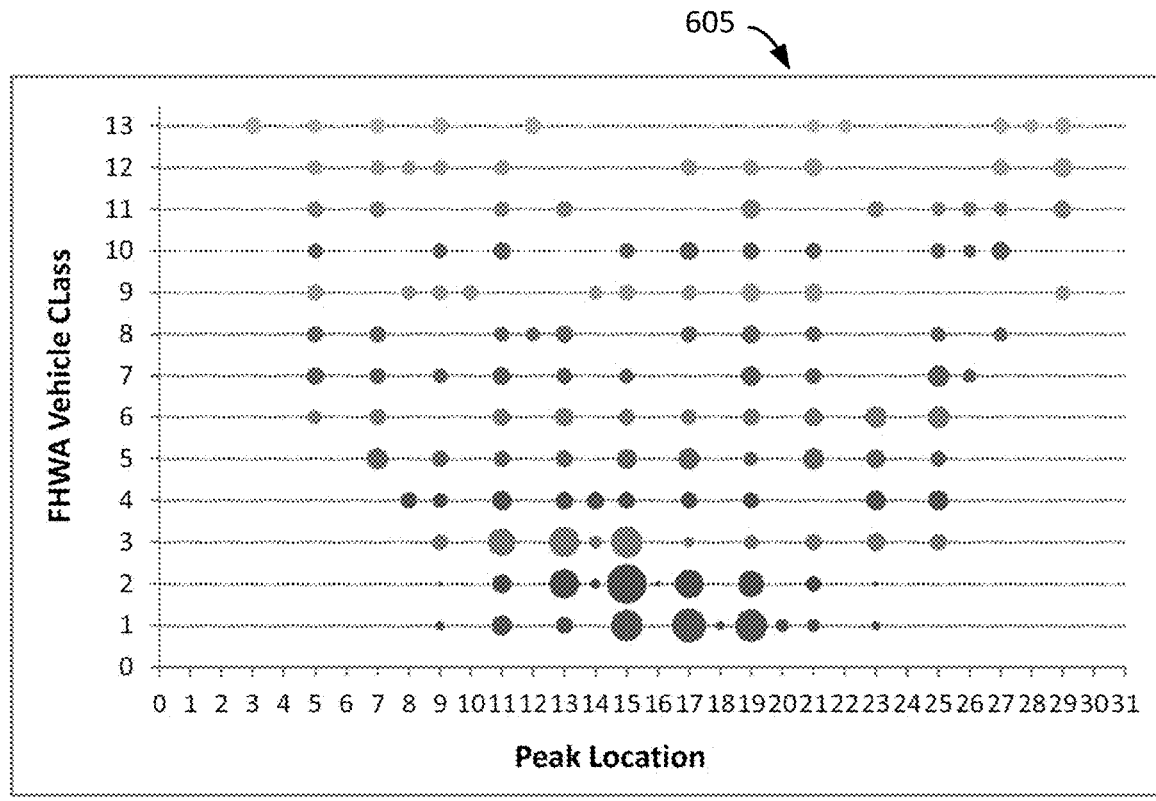
FIG. 6B shows a visual representation of the table of FIG. 6A.
FIG. 6C shows the detailed peak location frequencies for FHWA Class 9 for an example dataset that was processed to produce 32 Haar wavelet points.

Table 601 in FIG. 6A shows the frequency of top 10 (i.e., X=10) peak locations among the FHWA 13 classes for the example embodiment where the vehicle signatures are represented by 32 Haar wavelet points. This is simply based on a tally of the peaks within the inventors training set database. Note that the total percentage in all cases is less than 100% as more than 10 peak locations were identified in all classes. Chart 605 in FIG. 6B shows the same information presented in table 601 graphically.

FIG. 6C shows table 610 which provides the percentage of peaks in FHWA class 9 for the inventors training set database. FHWA class 9 is the classification of our example vehicle signature first presented in FIG. 2B. The top 10 peak locations identified in gray are consistent with table 601 in FIG. 6A.

The X normalized Haar wavelet points, HAAR$_m$, are the normalized Haar wavelet point values corresponding to the X estimated peak locations, estPkLoc$_m$. For example, in FHWA Class 9 the estPkLoc$_m$=[5, 8, 9, 10, 14, 15, 17, 19, 21, 29]. Thus for the example shown in FIG. 2E, HAAR$_m$= [1.0000, 0.3652, 0.5403, 0.6948, 0.2515, 0.3162, 0.1605, 0.1109, 0.1069, 0.2182].

Input data module 202 thus produces input data 203. In some embodiments input data 203 is <estPks, fPkLoc, fPkV, HAAR$_m$>, for all training examples in set 201. (In this embodiment determining estPkLoc$_m$ is an intermediate step used to find HAAR$_m$ and is not used as part of input data 203.) While here we did not include vehicle classification explicitly as part of the input data it is understood that the classification information is still associated with each input data 203. For X=10, each input data 203 may be represented as a vector of length 13. K-means clustering module 209 performs K-means clustering on all the input data being considered (e.g., across a single FHWA vehicle class). The number of clusters K may be selected in any suitable way. For example, in some embodiments K is selected using the elbow method. In some embodiments the initial clustering centers are selected using the average values of the input data 203 per CLRVC code. Each of the resulting clusters represents a potentially valid vehicle (sub-) class if the vehicle class is unique based on the field observation or the size of the clusters are greater than about 30 training examples. It is noted that K-means clustering is an exemplary embodiment; any suitable algorithm may be implemented (e.g., through module 209 or in another way) to organize input data 203.

As an example, the K-means clustering may be performed on FHWA Class 2. FHWA Class 2 includes CLRVC's 22210, 22211, and 22290. Using the elbow method with the inventor's data set it was determined that K=6. The K means clustering resulted in 6 clusters labelled KMC 22210, KMC 22220, KMC 22230, KMC 22211, KMC 22212, KMC 22213. These clusters were associated with the CLRVCs in FHWA Class 2. Specifically vehicle signatures having CLRVC 22210 were found in clusters KMC 22210, KMC 22220, and KMC 22230; signatures having CLRVC 22211 were found in KMC 22211, KMC 22212, and KMC 22213; and signatures having CLRVC 22290 were found in KMC 22210 and KMC 22220. Note that certain clusters had vehicle signatures having different CLRVCs.

Once each training example has been assigned to one of K clusters by module 209, an averaging module 208 averages feature values of the training examples in each cluster. Particularly the features that are averaged are the wavelet points W (e.g., for 32 Haar wavelet points $W=[W_0, W_1, \ldots, W_{31}]$); the estimated number of peaks, estPks; the first peak location, fPkLoc; and the first peak value, fPkV. Thus each cluster produces one vector output <W, estPks, fPkLoc, fPkV> which is the average of the respective values of the training examples in that cluster. Note that the wavelet points, W, are averaged on an index by index basis (e.g., $W_0$ is the average of all wavelet points with index 0 in the cluster). For the example embodiment where the vehicle signature is represented by 32 Haar wavelet points the vector for each cluster has 35 values. The results are stored as VSTL 125.

New vehicle designs (i.e., new vehicle types) may be identified as new vehicles are introduced into the market place, or as the classification system is used in different areas of the world. System 200 may be used to update VSTL 125 to include the new designs. Updating is done as follows. (1) Add the new vehicle types' signature data to their corresponding vehicle classes. (2) Re-run system 200 for the new data sets (e.g., on classes having new vehicle signatures representing the new vehicle types). (3) If it is determined that there is no need for additional (new) clusters, there is no need for re-estimation; if there are new clusters, use the new K-mean clustering results to regenerate the VSTL for the affected vehicle classes.

Figure 3A:
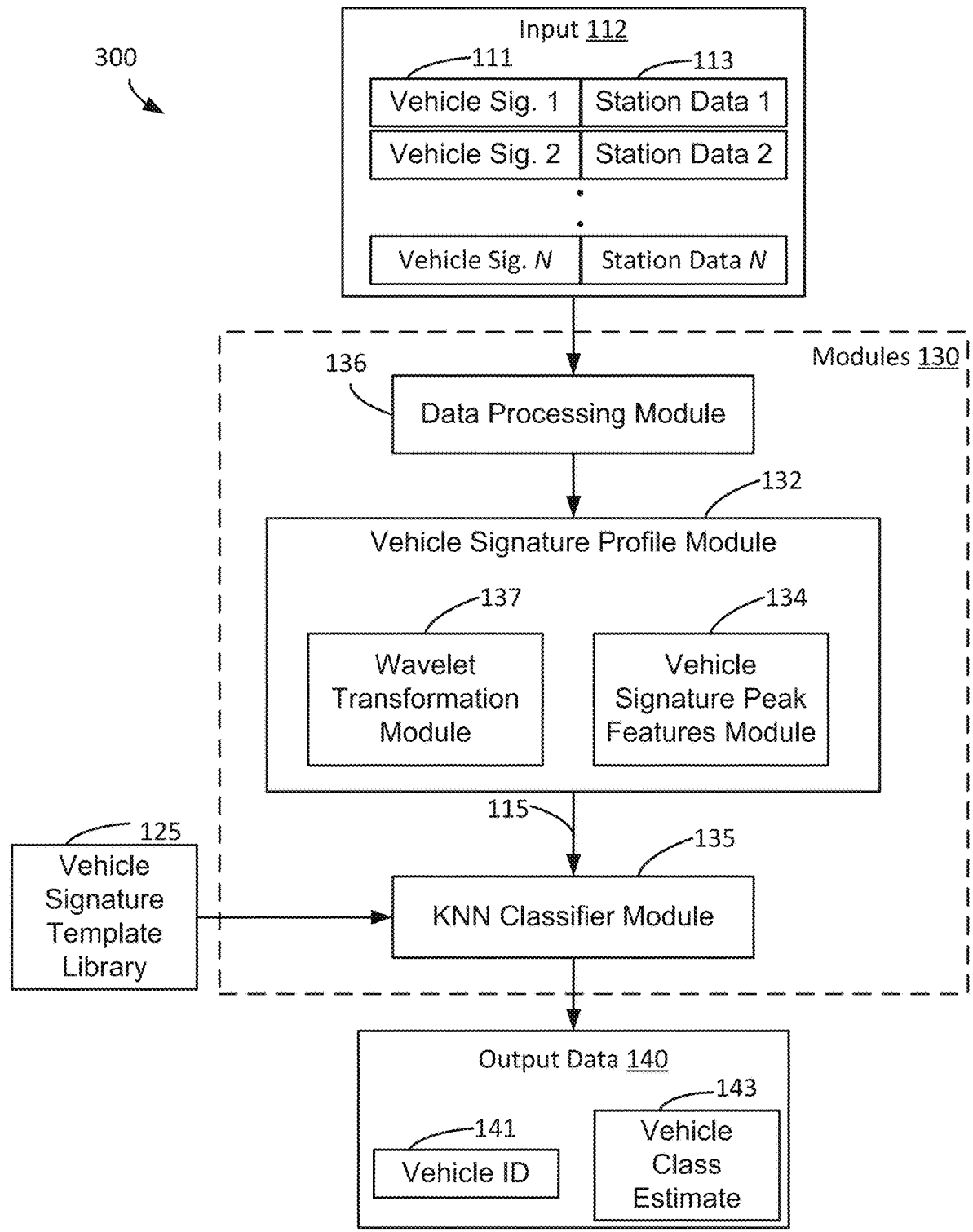
FIG. 3A shows a system for estimating vehicle class based on a vehicle signature from an inductive loop, according to some embodiments.

Having discussed the generation of VSTL 125, attention is now turned to FIG. 3A, which shows a system 300 for estimating vehicle class based on a vehicle signature from ILS 110 (FIG. 1). System 300 uses VSTL 125 to facilitate classification of vehicles based on their vehicle signature. System 300 may be implemented as part of system 100 through functional modules 130 or in any suitable way.

In system 300, modules 130 include a data processing module 136, a vehicle signature profile module 132, a wavelet transformation module 137, a vehicle signature peak features module 134, and a KNN classifier module 135.

Modules 130 operate on input data 112. Input data 112 includes vehicle signatures 111 (which have been pre-parsed into packages as described above) and may also include station data 113. Station data 113 includes the additional information for mapping vehicle signatures 111 to a specific time and location (e.g., a traffic detection station and lane). Station data 113 may be associated with the corresponding vehicle signature in any suitable way.

In some embodiments, input data 112 is digital data that has a package for each vehicle signature. For example each package in the input data may include (i) stn—the traffic detection station identifier, (ii) VID—a vehicle identifier associated with the parsed signature, (iii) l—the lane ID, (iv) t—a timestamp, (v) s—the number of data points in the vehicle signature, and (vi) m—a vector of the data points in the vehicle signature.

The vehicle identifier, VID, may be any suitable identifier for the vehicle. In some embodiments, VID is a unique, arbitrary identifier.

The sample rate, r, of the vehicle signature, m, may be fixed or specified by another variable. In some embodiments, the sample rate is 1,000 samples per second or thereabout. Though, any suitable sample rate may be used (e.g., in excess of around 500 samples per second).

Figure 3C:
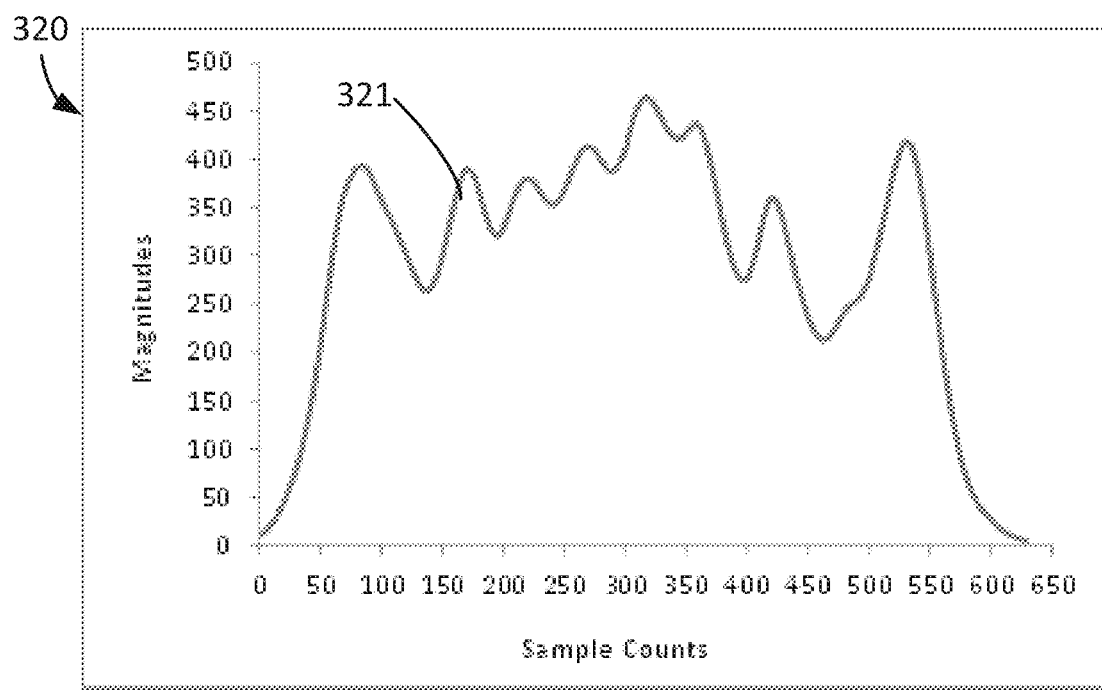
FIG. 3C shows a plot of the vehicle signature from the example input data of FIG. 3B.

An example of an input data package 310, represented in human readable form, is provided in FIG. 3B. The vehicle signature, m, in this package has 629 entries (s=629), each representing the magnitude of an inductance change of the ILS 110 due to the traversing vehicle. FIG. 3C shows a plot 320 of vehicle signature 321 for input data package 310 of FIG. 3B. Again, this is merely a single package of parsed input data and many packages of input data 112 may be processed as vehicles pass over ILS 110. Each package of input data 112 corresponds to a potential passing of a vehicle over ILS 110 and has the resulting vehicle signature. Thus, modules 130 shown in FIG. 3A may operate serially on a plurality of packages of input data 112. Further, ILS 110 may be one of a plurality of such sensors, potentially located in different vehicle lanes or at different locations along a roadway. Thus, modules 130 may additionally operate on the packages of input data 112 in parallel or in other ways.

Each package of input data 112 may be processed as follows by system 300 to determine a vehicle class estimate for the package. Data processing module 136 receives a package of input data 112 and determines if the vehicle signature is representative of a vehicle passing over ILS 110 or if it is not. The latter is considered "noise" and is filtered out by data processing module 136; no further processing is performed on such packages of input data 112. Module 136 may use any suitable filtering process to evaluate a vehicle signature. For example, a vehicle signature may be considered "noise" if the number of data points in the signature is smaller than a set threshold or if the greatest magnitude of vehicle signature is smaller than another set threshold. In some other embodiments such filtering may be performed as part of parsing the ILS response.

Module 136 may perform processing on a vehicle signature such as that described in connection with data processing module 131 in FIG. 2A. It is noted that averaged feature values are generated for each cluster in the VSTL while "averaging" is not needed for individual vehicle signature in the KNN process.

The resulting vehicle signature is passed by data processing module 136 to vehicle signature profile module 132. Vehicle signature profile module 132 generates input data 115 for KNN classifier module 135. Data 115 includes (a) normalized wavelet points, W; (b) an estimated number of signature waveform peaks, estPks; (c) the first signature waveform peak location, fPkLoc; and (d) the first signature waveform peak value, fPkV. In this embodiment the Haar wavelet is used to generate 32 normalized Haar wavelet points indexed 0 to 31 (i.e., $W=[W_0 \ldots W_{31}]$). Though any suitable wavelet transformation, number of wavelet points, and indexing may be used.

The 32 normalized Haar wavelet points, W, are generated by wavelet transformation module 137. Module 137 may perform the wavelet transformation in ways similar to those discussed in connection with module 133 in FIG. 2A. For example, the Haar 2 wavelet at level 8 decomposition may be used to produce 32 Haar wavelet points. Again, any suitable percentage of wavelet coefficients may be kept by module 137 in generating the 32 Haar wavelet points.

Vehicle signatures peak features module 134 estimates the number of signature waveform peaks, estPks, and determines the first signature waveform peak location, fPkLoc, and value, fPkV. Module 134 may determine estPks, fPk-Loc, and fPkV in ways similar to those described for identically named variables in connection with input data module 202 in connection with system 200 (FIG. 2A). As discussed in connection with input data module 202, estPks, fPkLoc, and fPkV may be normalized in a suitable way.

Using the KNN classifier input data 115, <[$W_0$, $W_1$, ..., $W_{31}$], estPks, fPkLoc, fPkV> and the VSTL 125, KNN classifier module 135 performs KNN classification. Module 135 determines the "distance" of the input data 115 to each VSTL entry. In some embodiments Euclidean distance is used. The Euclidean distance is calculated as:

$$D(S, L_j) = \sqrt{A^2 + B^2 + C^2 + \sum_{m=0}^{M-1} [S(W_m) - L_i(W_m)]^2}$$

where S is a specific package of KNN classifier input data 115, $L_j$ is the jth VSTL library entry, M is the number of wavelet points, $A=S(estPks)-L_i(estPks)$, $B=S(fPkLoc)-L_i(fPkLoc)$, and $C=S(fPkV)-L_i(fPkV)$. Though, distance may be calculated in any suitable way.

It should be appreciated that KNN classification is used in some embodiments and that other algorithms may be used for classification of input data 115.

The K VSTL entries having the smallest distance to input data 115 are identified. The vehicle class estimate 143 is determined as the most common vehicle class among the K VSTL entries.

In system 300, the value of K for the KNN classifier may be 1, 2, 3, 4, 5 or any other suitable number. In some embodiments, the K is chosen empirically such that different numbers of K are tried and the K with the best accuracy is selected. The K should be large enough to avoid noisy decision boundaries but should be also small enough to include only nearby samples. However, if the data are not uniformly distributed, larger K may introduce more errors. In such case, K=1 may be appropriate. Trail-and-error methods with cross validation methods may be applied to select the K.

If K=1 the estimated vehicle classification is simply the vehicle classification of the entry in the signature library having the smallest distance to the input data. If K>1 the estimated vehicle classification may be identified as the most common (statistical mode) vehicle classification among the K entries. A tie may be resolved, for example, selecting the vehicle classification having the shortest average distance for its entries.

Once system 300 estimates the vehicle class for the vehicle signature the information may be recorded or presented in a suitable way. In some embodiments system 300 stores in memory the estimated vehicle class together with the vehicle signature and possibly other input data. In some embodiment the estimated vehicle class is simply tallied. The tally make be done on a lane by lane basis, a location basis, or in any suitable way. In some embodiments the original input data may be saved with the estimated classification, while in others the input data may be discarded once the vehicle class is estimated.

Once collected the vehicle class information may be analyzed to evaluate traffic performance measures, vehicle miles traveled by vehicle class, the impacts of vehicular travel, estimate greenhouse gas emission, develop effective infrastructure management and development, and the like.

Systems 100, 200 and 300 may be used to implement methods performing acts described in connection with the modules of the respective systems. Though these acts may be implemented in any suitable way.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any suitable manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

For the purposes of describing and defining the present disclosure, it is noted that terms of degree (e.g., "substantially," "slightly," "about," "comparable," etc.) may be utilized herein to represent the inherent degree of uncertainty that may be attributed to any quantitative comparison, value, measurement, or other representation. Such terms of degree may also be utilized herein to represent the degree by which a quantitative representation may vary from a stated reference (e.g., about 10% or less) without resulting in a change in the basic function of the subject matter at issue. Unless otherwise stated herein, any numerical values appeared in this specification are deemed modified by a term of degree thereby reflecting their intrinsic uncertainty.

Ranges described by the present disclosure are generally inclusive of the stated values. For example, the range between 0 and 1 includes the values of 0 and 1. An open interval does not include its endpoints, and is indicated with parentheses. For example, (0, 1) means greater than 0 and less than 1. A closed interval is an interval which includes all its limit points, and is denoted with square brackets. For example, [0,1] means greater than or equal to 0 and less than or equal to 1. A half-open interval includes only one of its endpoints, and is denoted by mixing the notations for open and closed intervals. (0, 1] means greater than 0 and less than or equal to 1, while [0, 1) means greater than or equal to 0 and less than 1.

Hardware, software, and other system modules may be operably connected to one another. Operably connected components may be directly connected together or may be connected through one or more intermediate modules. Signals may be passed between components that are operably connected. Such signals may be modified by such intermediate modules.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A system for classifying vehicles, the system comprising: a processor; and a non-transitory computer readable memory configured to store a classification library having a plurality of entries generated from a training vehicle signature dataset, each entry in the library having (i) a vehicle classification, and (ii) for each of K clusters (I) an average value of a location of a first peak among training set members in said cluster, (II) an average value of the first peak among training set members in said cluster, (III) an average value of the quantity of peaks among training set members in said cluster, and (IV) an average sequence for the training set members in said cluster; and a plurality of software modules executable by the processor, the modules comprising a sequence generating module operably connected to an inductive loop sensor for receiving a vehicle signature therefrom, the vehicle signature being a response to a vehicle passing over the inductive loop sensor, and configured to convert the vehicle signature into a sequence of numbers; an input set generating module operably connected to the sequence generating module for receiving the sequence of numbers, and configured to identify peaks in the sequence and to generate an input set for the vehicle, the input set comprising the sequence, a quantity of peaks in the sequence, a location of a first peak in the sequence, and a value of the first peak; a classification module operably connected to the memory for accessing the classification library, operably connected to the input set generating module for receiving the input set, and configured to perform K-nearest neighbor (KNN) classification with the classification library on the input set thereby determining an estimated vehicle classification for the vehicle, wherein for each of the plurality of entries in the classification library, the classification module performs the KNN classification by determining a Euclidian distance between the input set and a respective entry in the classification library based on at least (i) a first difference between the quantity of peaks in the sequence and a respective quantity of peaks in the respective entry ("A"), (ii) a second difference between the location of the first peak in the sequence and a location of a first peak in the respective entry ("B"), and (iii) a third difference between the value of the first peak in the sequence and a value of the first peak in the respective entry ("C"); and an output module configured to output the estimated vehicle classification for the vehicle.

2. The system of claim 1, wherein the input set generating module identifies each local maximum in the sequence as a peak; the input set generating module identifies each local minimum in the sequence as a peak; and the output module records the estimated vehicle classification to the memory along with the vehicle signature and station data.

3. The system of claim 1, wherein the vehicle classification of each entry in the vehicle signature library is one of 13 Federal Highway Administration classifications; and the Euclidian distance between the input set and a respective entry in the classification library is calculated as $$\sqrt{A^2 + B^2 + C^2 + \sum_{m=0}^{M-1} [S(W_m) - L(W_m)]^2}$$

where A, B, and C are the first difference, the second difference, and the third difference respectively, B(Wm) is an m-th number in the sequence of the input set, L(Wm) is an m-th number in the respective entry in the classification library, and M is a total number of numbers in the sequence.

4. The system of claim 1, wherein the sequence generating module calculates wavelet coefficients for the vehicle signature and forms the sequence of numbers from a subset of the wavelet coefficients; and the output module increments a tally for a vehicle classification corresponding to the estimated vehicle classification.

5. The system of claim 4, wherein the sequence generating module uses a largest N % of the wavelet coefficients to regenerate the vehicle signature, where N is in the interval [50, 100).

6. The system of claim 5, wherein the wavelet coefficients calculated by the sequence generating module are Haar wavelet coefficients, and the sequence has 32 numbers.

7. The system of claim 1, wherein the input set generating module identifies as a peak each number in the sequence where the following is logically true: [an immediately preceding number is less than said number and an immediately following number is less than said number (+,−)] OR [the immediately preceding number is less than said number and the immediately following number is equal to said number (+,0)] OR [the immediately preceding number is greater than said number and the immediately following number is greater than said number (−,+)] OR [the immediately preceding number is equal to said number and the immediately following number is greater than said number (0,+)] OR [the immediately preceding number is greater than said number and the immediately following number is equal to said number (−,0)] OR [the immediately preceding number is equal to said number and the immediately following number is less than said number (0,−)].

8. The system of claim 7, wherein the input set generating module identifies the location in the sequence of the first peak as an index of a first number in the sequence identified as a peak, and identifies the value of the first peak as said first number.

9. The system of claim 1, wherein the input set generating module normalizes each number in the input set; and the output module that determines traffic performance based on the estimated vehicle classification.

10. The system of claim 9, wherein the classification module calculates a Euclidian distance between the input set and each of the plurality of entries in the classification library, identifies K (K a positive integer) smallest Euclidian distance entries, and determines the estimated vehicle classification based on said K entries.

11. A system for generating a vehicle classification library and classifying vehicles, the system comprising: a processor; and a non-transitory computer readable memory storing a plurality of training examples, each training example being associated with a vehicle that has passed over an inductive loop sensor and each training example having a vehicle signature from said inductive loop sensor and a vehicle classification; and a plurality of software modules executable by the processor, the modules comprising a grouping module configured to group training examples having a same vehicle classification; a generating module to generate for each group a set of inputs by, for each training example in the group, (i) converting the vehicle signature into a sequence of numbers, (ii) identifying peaks in the sequence, and (iii) forming an input containing (A) a quantity of peaks in the sequence, (B) a location of a first peak in the sequence, (C) a value of the first peak, and (D) values of said sequence at select peak locations; a clustering module configured to receive the set of inputs for a group from the generating module and use K-means clustering to organize the inputs of said set into K clusters; a library module configured to create a library entry for each cluster by (i) averaging the value of the location of the first peak among the inputs in said cluster, (ii) averaging the value of the first peak among the inputs in said cluster, (iii) averaging the value of the quantity of peaks among the inputs in said cluster, and (iv) averaging the sequences corresponding to the inputs in said cluster at each position in said sequences to form an averaged sequence; a recording module to add each library entry created by the library module to the vehicle classification library and store the vehicle classification library in non-transitory computer readable the memory; and a classification module operably connected to the memory to access the vehicle classification library, configured to receive an unclassified input set for a vehicle of unknown classification, and configured to perform K-nearest neighbor (KNN) classification with the vehicle classification library on the unclassified input set thereby determining an estimated vehicle classification for the vehicle, wherein (i) the unclassified input set specifies an unclassified sequence, a quantity of peaks in the unclassified sequence, a location of a first peak in the unclassified sequence, and a value of the first peak, and (ii) for each library entry in the vehicle classification library the classification module performs the KNN classification by determining a Euclidian distance between the unclassified input set and said library entry based on at least (I) a first difference between the quantity of peaks in the unclassified sequence and a quantity of peaks in said library entry, (II) a second difference between the location of the first peak in the unclassified sequence and a location of a first peak in said library entry, (III) a third difference between the value of the first peak in the unclassified sequence and a value of the first peak in said library entry, and (IV) fourth differences between each number in the unclassified sequence and a number in a corresponding position of the averaged sequence in said library entry.

12. The system of claim 11, wherein the generating module identifies as a peak each number in the sequence where the following is logically true: [an immediately preceding number is less than said number and an immediately following number is less than said number (+,−)] OR [the immediately preceding number is less than said number and the immediately following number is equal to said number (+,0)] OR [the immediately preceding number is greater than said number and the immediately following number is greater than said number (−,+)] OR [the immediately preceding number is equal to said number and the immediately following number is greater than said number (0,+)] OR [the immediately preceding number is greater than said number and the immediately following number is equal to said number (−,0)] OR [the immediately preceding number is equal to said number and the immediately following number is less than said number (0,−)].

13. The system of claim 11 wherein, to convert the vehicle signature into the sequence, the generating module is configured to calculate wavelet coefficients for the vehicle signature and regenerate the vehicle signature using a subset of the wavelet coefficients.

14. The system of claim 13, wherein the subset of the wavelet coefficients used are a largest N % of the wavelet coefficients, where N is in the interval [50, 100).

15. The system of claim 14, wherein the wavelet coefficients are Haar wavelet coefficients, and the sequence has 32 numbers.

16. The system of claim 11, wherein the identifying peaks in the sequence by the generating module comprises identifying each local maximum in the sequence as a peak and identifying each local minimum in the sequence as a peak; and the select peak locations are a 4 or more most frequent peak locations for vehicle signatures within the group.

17. The system of claim 11 wherein each group is for one Federal Highway Administration vehicle classification, and the select peak locations are a 4 or more most frequent peak locations for vehicle signatures within the group.

18. The system of claim 11 further comprising: a sequence generating module operably connected to an inductive loop sensor for receiving an unclassified vehicle signature therefrom, and configured to convert the unclassified vehicle signature into the unclassified sequence; an unclassified input set generating module operably connected to the sequence generating module for receiving the unclassified sequence, and configured to identify peaks in the unclassified sequence and to generate the unclassified input set; and an output module configured to output the estimated vehicle classification.

19. A method for generating a vehicle classification library and classifying vehicles, the method comprising: (I) storing a plurality of training examples in a non-transitory computer readable memory, each training example being associated with a vehicle that has passed over an inductive loop sensor and each training example having a vehicle signature from an inductive loop sensor and a vehicle classification; (II) operating one or more processors to group the training examples having a same vehicle classification; (III) for each group, further operating the one or more processors to (A) generate a set of library inputs by, for each of the training examples in the group, (i) converting the vehicle signature into a sequence; (ii) identifying peaks in the sequence, the identifying comprising identifying each local maximum in the sequence as a peak and identifying each local minimum in the sequence as a peak; and (iii) calculating a library input comprising a quantity of peaks in the sequence, a location of a first peak in the sequence, a value of the first peak, and values of said sequence at select peak locations; (B) cluster library inputs in the set of library inputs into Kclusters using a K-means clustering; (C) create a library entry for each cluster by (i) averaging the value of the location of the first peak among the library inputs in said cluster; (ii) averaging the value of the first peak among the library inputs in said cluster; (iii) averaging the value of the number of peaks among the library inputs in said cluster; and (iv) averaging the sequences corresponding to the library inputs in said cluster at each position in the sequences; and (D) store the library entry to a vehicle classification library in the non-transitory computer readable memory; and (IV) further operating the one or more processors to (A) receive an unclassified input set for a vehicle of unknown classification, the unclassified input set specifying an unclassified sequence, a quantity of peaks in the unclassified sequence, a location of a first peak in the unclassified sequence, and a value of the first peak; (B) perform K-nearest neighbor (KNN) classification with the vehicle classification library on the unclassified input set thereby determining an estimated vehicle classification for the vehicle, wherein for each library entry in the vehicle classification library a Euclidian distance between the unclassified input set and said library entry is determined based on at least (i) a first difference between the quantity of peaks in the unclassified sequence and a quantity of peaks in said library entry, (ii) a second difference between the location of the first peak in the unclassified sequence and a location of a first peak in said library entry, and (iii) a third difference between the value of the first peak in the unclassified sequence and a value of the first peak in said library entry.

20. The method of claim 19 further comprising: receiving the unclassified vehicle signature from an inductive loop sensor; storing in the non-transitory computer readable memory the unclassified signature as the unclassified sequence; and operating the one or more processors to identify the peaks in the unclassified sequence; determine a quantity of peaks in the unclassified sequence; determine the location of the first peak in the unclassified sequence; determine the value of the first peak; and store the estimated vehicle classification with the unclassified vehicle signature in the non-transient, computer-readable memory.

* * * * *